(12) United States Patent
Ito

(10) Patent No.: US 7,516,994 B2
(45) Date of Patent: Apr. 14, 2009

(54) PEDESTRIAN PROTECTION APPARATUS FOR VEHICLE

(75) Inventor: Kaoru Ito, Nisshin (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 314 days.

(21) Appl. No.: 11/448,994

(22) Filed: Jun. 7, 2006

(65) Prior Publication Data

US 2007/0046043 A1 Mar. 1, 2007

(30) Foreign Application Priority Data

Aug. 26, 2005 (JP) ............................. 2005-246151

(51) Int. Cl.
 *B60R 19/34* (2006.01)
(52) U.S. Cl. ......................... 293/133; 293/102; 293/132
(58) Field of Classification Search ................. 293/102, 293/132, 133
 See application file for complete search history.

(56) References Cited

FOREIGN PATENT DOCUMENTS

JP 2004-203183 A1 7/2004

*Primary Examiner*—Lori L Lyjak
(74) *Attorney, Agent, or Firm*—Burr & Brown

(57) ABSTRACT

A pedestrian protection apparatus disposed at a front of a vehicle for protecting a pedestrian in the event of a collision between the pedestrian and a front end of the vehicle, the apparatus including: a leg sweep member which is disposed at a lower part of the front end of the vehicle so as to protrude frontward for sweeping a leg portion of the pedestrian; and a fixing mechanism which fixes the leg sweep member to a structural member of the vehicle and which releases the fixation of the leg sweep member to the structural member when an object including the pedestrian advances, by an amount that exceeds a prescribed reference amount, with respect to the vehicle in a backward direction of the vehicle from a position of the front end of the vehicle against which the object has hit upon the collision.

24 Claims, 13 Drawing Sheets

PEDESTRIAN PROTECTION APPARATUS FOR VEHICLE

The present application is based on Japanese Patent Application No. 2005-246151 filed on Aug. 26, 2005, the contents of which are incorporated herein by reference.

BACKGROUND OF THE INVENTION

1. Field of the Invention

The present invention concerns in general improved techniques relating to a pedestrian protection apparatus for a vehicle, an installation structure of a leg sweep member, a front structure of a vehicle, and a bumper of a vehicle. The invention concerns in particular such improved techniques in which occurrence of damages to the vehicle upon a so-called light collision (which will be defined below) is prevented while protecting a leg portion of a pedestrian collided (contacted) with a front end of the vehicle.

2. Discussion of Related Art

In vehicles such as automobiles, there are conventionally disposed bumpers at a front end and a rear end of the vehicle for mainly absorbing impact energy generated upon collision and protecting a vehicle body and passengers. In recent years, a pedestrian protection apparatus is provided at a front of the vehicle so as to be disposed inside of the bumper or disposed independently of the bumper, for protection of the pedestrian when the pedestrian collided with (contacted) the front end of the vehicle.

As well known, the pedestrian protection apparatus includes a leg sweep member having a breadth or width dimension that is substantially the same as the vehicle width and enhanced rigidity so as to exhibit a relatively large degree of strength with respect to a load in a vehicle length or longitudinal direction (in a frontward and backward direction of the vehicle). In general, the leg sweep member is disposed inside of a lower part of a bumper cover of a bumper attached to the front end of the vehicle, more specifically, the leg sweep member is disposed inside of a part of the bumper cover which corresponds to a height position of a part of the leg portion of the pedestrian that is below a knee, so as to protrude in a frontward direction of the vehicle. The thus disposed leg sweep member is fixedly secured by bolts or the like to a structural member which is located at a lower part of the front of the vehicle. For instance, the leg sweep member is secured to a portion of a frame such as a radiator support or a cross member, or a portion of a body panel located at a lower part of the front of the vehicle.

In the thus constructed pedestrian protection apparatus, when the pedestrian collides with or comes into contact with the front end of the vehicle, the leg sweep member is arranged to sweep or scoop the leg portion of the pedestrian below the knee, causing the pedestrian to fall down or to be thrown over toward the vehicle. Accordingly, it is possible to advantageously limit a bending-angle of the knee in an unnatural or undesirable direction upon contact of the pedestrian with the vehicle, thereby minimizing occurrence of injuries to the knee such as bone fractures and assuring protection and safety of the pedestrian.

In the conventional pedestrian protection apparatus described above, however, the leg sweep member with relatively high rigidity is partially connected by bolts or the like to the vehicle structural member. When the impact energy larger than that in collision with the pedestrian is input to the leg sweep member upon a so-called a light or insignificant collision in which the vehicle collides, at a relatively low speed, with a sturdy object having a larger weight than the pedestrian, the leg sweep member may be considerably deformed or bent and contacts neighboring components, devices, equipment and the like, giving damages to those components, devices and so on. In addition, since the leg sweep member is disposed at the lower part of the front of the vehicle, the cooling equipment such as a radiator disposed in the vicinity of the lower part may be damaged by the leg sweep member. In this instance, even in a case of the light collision in which damages to the vehicle body is not so much, the vehicle may suffer from considerably serious damages such as inability to run.

In the light of the above, JP-A-2004-203183 discloses, as a technique to solve the aforementioned problems, a vehicle front structure constructed as follows: Namely, the leg sweep member is fixed to the vehicle structural member by suitable clips or the like. Upon inputting of the load larger than that in collision with the pedestrian, the clips are fractured, thereby releasing fixation of the leg sweep member to the structural member.

The above-indicated publication JP-A-2004-203183 teaches the following effect achieved by the structure descried above: When the pedestrian collides with the front end of the vehicle, the leg sweep member remains fixed to the vehicle structural member and advantageously exhibits its leg sweeping function, thereby assuring protection of the pedestrian collided with the vehicle. Further, in the event of the above-indicated light collision of the vehicle at its front end, the leg sweep member is separated from the front of the vehicle, so that the components, the devices and the equipment disposed at the front of the vehicle are effectively prevented from being damaged due to contact thereof with the leg sweep member.

The inventor of the present invention conducted various experiments relating to such a conventional front end structure of the vehicle and found that it is actually difficult in the conventional technique described above to reliably release the leg sweep member from the vehicle structural member upon the light collision of the vehicle at its front end while keeping the leg sweep member fixed to the structural member upon collision between the pedestrian and the front end of the vehicle.

Described more specifically, a pedestrian collision test was performed on the supposition of a collision of a pedestrian with a front end of a vehicle in which a pedestrian protection apparatus having a leg sweep member was disposed at a front of the vehicle, and there was examined a change with the elapse of time in a load inputted, upon the collision of the pedestrian with the vehicle, to one of fixing portions of the leg sweep member at which the leg sweep member was fixed to the vehicle structural member, which one fixing portion was the closest to a position of the front end of the vehicle against which the pedestrian has hit upon the collision. Further, the inventor performed a light collision test on the supposition of a light or insignificant collision of an obstacle with the front end of the vehicle, and there was examined a change with the elapse of time in a load inputted, upon the collision of the obstacle with the vehicle, to one of fixing portions of the leg sweep member at which the leg sweep member was fixed to the vehicle structural member, which one fixing portion was the closest to a position of the front end of the vehicle against which the obstacle has hit upon the collision. The results of the examinations are indicated in the graph of FIG. 15.

In the pedestrian collision test, there was used, as a test vehicle, a vehicle in which a front bumper was disposed at its front end and the leg sweep member was disposed inside of a synthetic-resin-made bumper cover of the front bumper, such that the leg sweep member was fixed to a radiator support at six points substantially equally spaced apart from each other in the vehicle width direction. A dummy having a weight of 14 kg was collided with a forward end of the front bumper of the test vehicle at a speed of 40 km/h. In the light collision test, a test vehicle similar to that used in the pedestrian collision test was run at a speed of 16 km/h and was collided, at the forward end of the front bumper, with a concrete wall having a weight of 1.5 t. In the pedestrian collision test, the dummy was collided with a substantially middle portion of the forward end of the front bumper in the vehicle width direction. In the light collision test, the test vehicle was collided with the concrete wall at one of opposite end portions of the forward end of the front bumper in the vehicle width direction.

As apparent from the graph of FIG. 15, while there is—a large time difference between a point of time when the load inputted to the fixing potion of the leg sweep member to the vehicle structural member reaches a maximum value in the pedestrian collision and a point of time when the load inputted to the fixing portion of the leg sweep member to the vehicle structural member reaches a maximum value in the light collision, it is recognized that the maximum value of the load in the pedestrian collision and the maximum value of the load in the light collision are substantially equal to each other, namely, about 4800 N. This fact clearly indicates that the maximum value of the load inputted to the leg sweep member in the event of the collision between the pedestrian and the front end of the vehicle and the maximum value of the load inputted to the leg sweep member in the event of the light collision of the vehicle at its front end are substantially equal to each other. Accordingly, it is impossible or considerably difficult to judge, upon occurrence of a collision accident at the vehicle front end, whether the collision is the pedestrian collision or the light collision, on the basis of the magnitude of the load inputted to the leg sweep member.

Therefore, it can be clearly recognized from the above that it is considerably difficult to release the leg sweep member from the vehicle structural member and separate the leg sweep member from the front of the vehicle, in agreement with a timing of occurrence of the light collision of the vehicle at its front end, even if the leg sweep member is arranged to be released from the structural member upon inputting of an impact load larger than that in the collision with the pedestrian, as taught by the conventional technique. Accordingly, the conventional technique mentioned above does not sufficiently attain both of protection of the leg portion of the pedestrian collided with the front end of the vehicle and prevention of occurrence of damages to the vehicle due to the light collision of the vehicle at its front end.

SUMMARY OF THE INVENTION

The present invention has been made in the light of the situations described above. It is therefore an object of the invention to provide a technique which sufficiently and reliably realizes protection of a leg portion of a pedestrian collided with a front end of a vehicle and prevention of occurrence of damages to the vehicle due to the light or insignificant collision of the vehicle at its front end.

In the course of the study for attaining the object indicated above, the inventor has focused on: (a) an amount of advancement of a leg portion of a pedestrian, upon a collision of the leg portion with a front end of a vehicle, with respect to the vehicle in a backward direction thereof from a position of the front end of the vehicle against which the leg portion has hit upon the collision; and (b) an amount of advancement of an obstacle, in the event of the light or insignificant collision of the vehicle at its front end, with respect to the vehicle in the backward direction thereof from a position of the front end of the vehicle against which the obstacle has hit upon the collision. There were conducted: a pedestrian collision test on the supposition of a collision of a leg portion of a pedestrian with a front end of a vehicle (automotive vehicle) having a known leg sweep member disposed inside of a front bumper; and a light collision test on the supposition of a light collision of such a vehicle at its front end. There were examined: the amount of advancement of the leg portion of the pedestrian in the backward direction of the vehicle upon the pedestrian collision, on the basis of an amount of deformation (displacement) of bumper cover of the front bumper at a position thereof against which the leg portion has hit in the collision, in the backward direction of the vehicle; and the amount of advancement of the obstacle in the backward direction of the vehicle upon the light collision, on the basis of an amount of deformation (displacement) of the bumper cover of the front bumper at a position thereof against which the obstacle has hit upon the collision, in the backward direction. Based on the results, there were obtained, according to a known method, relationships between: the respective amounts of deformation of the bumper cover upon the pedestrian collision and the light collision; and the load inputted to the bumper cover (the front bumper). The results are indicated in the graph of FIG. 16.

In the pedestrian collision test, there was used a test vehicle in which the front bumper was disposed at its front end and the leg sweep member was disposed inside of the synthetic-resin-made bumper cover of the front bumper, such that the leg sweep member was fixed to a radiator support. A dummy having a weight of 14 kg was collided with a forward end of the front bumper of the test vehicle at a speed of 40 km/h. In the light collision test, a test vehicle similar to that used in the pedestrian collision test was run at a speed of 16 km/h and was collided, at the forward end of the front bumper, with an obstacle such as a concrete wall having a weight of 1.5 t.

As apparent from the graph of FIG. 16, the maximum deformation amount of the forward end of the bumper cover of the front bumper in the backward direction of the vehicle upon the collision of the pedestrian with the front end of the vehicle was about 30 mm while the maximum deformation amount of the forward end of the bumper cover of the front bumper in the backward direction of the vehicle upon the light collision of the vehicle at its front end exceeded 90 mm. In other words, it is recognized that the maximum amount of advancement of the obstacle in the backward direction of the vehicle upon the light collision of the vehicle at its front end is considerably larger than the maximum amount of advancement of the leg portion of the pedestrian in the backward direction of the vehicle upon the collision of the pedestrian with the front end of the vehicle. Based on the recognition described above, the inventor has found that it is possible to clearly judge, upon occurrence of a collision accident at the front end of the vehicle, whether the collision is the pedestrian collision or the light collision, on the basis of the amount of advancement of the collided obstacle or pedestrian with respect to the vehicle in the backward direction of the vehicle.

The present invention has been developed based on the findings indicated above. The invention provides: a pedestrian protection apparatus disposed at a front of a vehicle for protecting a pedestrian in the event of a collision between the pedestrian and a front end of the vehicle, the apparatus comprising: a leg sweep member which is disposed at a lower part of the front end of the vehicle so as to protrude frontward for sweeping a leg portion of the pedestrian which has collided with the front end of the vehicle; and a fixing mechanism which fixes the leg sweep member to a structural member of the vehicle and which releases the fixation of the leg sweep member to the structural member when an object including the pedestrian which has collided with the front end of the vehicle advances, by an amount that exceeds a prescribed reference amount, with respect to the vehicle in a backward direction of the vehicle from a position of the front end of the vehicle against which the object has hit upon the collision. Here, the structural member of the vehicle means a member that constitutes a basic or fundamental structure of the vehicle and includes a chassis and a body.

In the pedestrian protection apparatus constructed according to the present invention, by setting the reference amount to be the same as a maximum amount of advancement of a portion (the leg portion) of the pedestrian at which the pedestrian has collided with the vehicle, with respect to the vehicle in the backward direction thereof from the position of the front end of the vehicle against which the pedestrian has hit upon the collision, for instance, the leg sweep member can be kept fixed to the structural member with high stability in the event of the collision of the pedestrian with the front end of the vehicle. Further, in the event of the light collision of the vehicle at its front end, the leg sweep member can be released from the structural member of the vehicle with high reliability when the amount of advancement of the object (obstacle) with respect to the vehicle exceeds the reference amount. Therefore, the leg sweep member can be effectively separated from the front of the vehicle in accordance with the timing of the occurrence of the light collision.

The pedestrian protection apparatus according to the present invention permits the leg sweep member to advantageously exhibit its leg sweeping function in the event of the collision of the pedestrian with the front end of the vehicle while, in the event of the light collision of the vehicle at its front end, preventing the leg sweep member from coming into contact with the components, the devices and the equipment provided at the front of the vehicle, with impact force generated upon the collision.

Accordingly, the present pedestrian protection apparatus sufficiently and reliably attains protection of the leg portion of the pedestrian collided with the front end of the vehicle and prevention of occurrence of damages to the components and the devices of the vehicle due to the light collision of the vehicle at its front end.

The present invention is preferably practiced in at least the following features.

(1) A pedestrian protection apparatus disposed at a front of a vehicle for protecting a pedestrian in the event of a collision between the pedestrian and a front end of the vehicle, the apparatus comprising:

a leg sweep member which is disposed at a lower part of the front end of the vehicle so as to protrude frontward for sweeping a leg portion of the pedestrian which has collided with the front end of the vehicle; and a fixing mechanism which fixes the leg sweep member to a structural member of the vehicle and which releases the fixation of the leg sweep member to the structural member when an object including the pedestrian which has collided with the front end of the vehicle advances, by an amount that exceeds a prescribed reference amount, with respect to the vehicle in a backward direction of the vehicle from a position of the front end of the vehicle against which the object has hit upon the collision.

(2) The apparatus according to the above feature (1), wherein the fixing mechanism includes: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface thereof which is one of opposite surfaces of the holding portion remote from the leg sweep member, the movable member being arranged to be moved, when being pushed by the object in accordance with the advancing movement of the object with respect to the vehicle in the backward direction of the vehicle, in the backward direction of the vehicle from an engaging position where the engaging surface of the holding portion and the engaging portion of the engaging protrusion engage each other, so that the movable member is located at a non-engaging position where the engagement of the engaging surface of the holding portion and the engaging portion of the engaging protrusion is released, when the amount of advancement of the object in the backward direction of the vehicle exceeds the prescribed reference amount, wherein, in a state in which the movable member is located at the engaging position, the leg sweep member is held by and between the engaging protrusion and the structural member via the holding portion of the movable member so as to be fixed to the structural member, and wherein, when the movable member is moved to the non-engaging position, the holding of the leg sweep member between the engaging protrusion and the structural member is released, whereby the leg sweep member is released from the structural member.

In the apparatus according to the above feature (2), with a relatively simple structure, the leg sweep member can be kept fixed to the structural member in the event of the collision of the pedestrian with the front end of the vehicle while, in the event of the light collision of the vehicle at its front end, releasing the leg sweep member from the structural member with high stability.

(3) The apparatus according to the above feature (2), wherein the holding portion of the movable member of the fixing mechanism includes: a through-hole formed through a thickness of the holding portion in a vertical direction of the vehicle; and a cutout groove which is formed at a circumferential portion of the through-hole so as to extend in the backward direction of the vehicle with a prescribed length and open in the opposite surfaces of the holding portion a lower one of which constitutes the engaging surface, wherein the engaging protrusion of the fixing mechanism is constituted by a bolt member which is fastened to the structural member of the vehicle and which includes a leg portion that can be inserted through the cutout groove and a head portion that cannot be inserted through the cutout groove while can be inserted through the through-hole, the head portion constituting the engaging portion, wherein the leg sweep member includes an opening through which the head portion of the bolt member can be inserted, wherein, in the state in which the movable member is located at the engaging position, the leg portion of the bolt member is inserted through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and wherein the holding of the leg sweep member between the head portion of the bolt member and the structural member of the vehicle is released, whereby the movable member and the leg sweep member drop downward, when the head portion of the bolt member is located in the through-hole of the holding portion in accordance with the movement of the movable member in the backward direction of the vehicle from the engaging position to the non-engaging position when being pushed by the object.

In the apparatus according to the above feature (3), the fixing mechanism can be easily provided in a simplified structure. Since the leg sweep member is arranged to drop downward when released from the structural member of the vehicle, the leg sweep member separated from the structural member is effectively prevented from coming into contact with various components, devices and the like disposed at the front of the vehicle, in the event of the light collision of the vehicle at its front end. Therefore, the present arrangement is effective to prevent occurrence of damages to the vehicle in the event of the light collision of the vehicle at its front end.

(4) The apparatus according to the above feature (1), wherein the fixing mechanism is constituted by including: a fixing device which fixes the leg sweep member to the structural member of the vehicle; a detecting device which successively detects an amount of advancement of the object with respect to the vehicle in the backward direction of the vehicle from the position of the front end of the vehicle against which the object has hit upon the collision; and a releasing device which releases the fixation of the leg sweep member to the structural member of the vehicle by the fixing device when the amount of advancement detected by the detecting device exceeds the prescribed reference amount.

In the apparatus according to the above feature (4), owing to the fixing mechanism, the leg sweep member can be kept fixed to the structural member in the event of the collision of the pedestrian with the front end of the vehicle while, in the event of the light collision of the vehicle at its front end, the leg sweep member can be released from the structural member with high reliability.

(5) The apparatus according to any one of the above features (1)-(4), further comprising a biasing device which is disposed between the leg sweep member and the structural member of the vehicle for biasing the leg sweep member in a downward direction.

In the apparatus according to the above feature (5), the leg sweep member can be quickly and reliably separated from the front of the vehicle in the event of the light collision of the vehicle at its front end, whereby the leg sweep member separated from the front of the vehicle is effectively prevented from coming into contact with various devices and equipment disposed at the front of the vehicle. In consequence, the present arrangement exhibits with higher stability the effect of prevention of the occurrence of the damages to the vehicle due to the light collision of the vehicle at its front end.

(6) The apparatus according to any one of the above features (1)-(5), wherein the structural member of the vehicle is one of a radiator support, a cross member, and a side member.

In the apparatus according to the above feature (6), the leg sweep member can be positioned with high reliability with respect to the lower part of the front of the vehicle.

(7) An installation structure for installing, on a front of a vehicle, a leg sweep member which is to be disposed at a lower part of a front end of the vehicle so as to protrude frontward for sweeping a leg portion of a pedestrian in the event of a collision between the pedestrian and the front end of the vehicle, wherein the leg sweep member is installed on the front of the vehicle such that the leg sweep member is fixed to a structural member of the vehicle that is disposed at the front thereof, by a fixing mechanism which fixes the leg sweep member to the structural member and which releases the fixation of the leg sweep member to the structural member when an object including the pedestrian which has collided with the front end of the vehicle advances, by an amount that exceeds a prescribed reference amount, with respect to the vehicle in a backward direction of the vehicle from a position of the front end of the vehicle against which the object has hit upon the collision.

In the installation structure according to the above feature (7), the reference amount may be set to be the same as an amount of advancement of a portion (the leg portion) of the pedestrian at which the pedestrian has collided with the front end of the vehicle, in the backward direction of the vehicle upon the collision, for instance. In this case, the leg sweep member can be kept fixed to the vehicle structural member with high stability in the event of the collision of the pedestrian with the front end of the vehicle while, in the event of the light collision of the vehicle at its front end, the fixation of the leg sweep member to the structural member can be released with high reliability in accordance with the timing of the occurrence of the light collision, whereby the leg sweep member can be effectively separated from the front of the vehicle.

In the arrangement according to the above feature (7), the leg sweep member can exhibit its leg sweeping function in the collision of the pedestrian with the front end of the vehicle, advantageously assuring protection of the leg portion of the pedestrian. Further, in the event of the light collision of the vehicle at its front end, it is possible to effectively prevent the leg sweep member from coming into contact with various devices and equipment disposed at the front of the vehicle, with impact force generated upon the collision, thereby avoiding damages to the devices and the equipment with higher reliability.

(8) The installation structure according to the above feature (7), wherein the fixing mechanism includes: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface thereof which is one of opposite surfaces of the holding portion remote from the leg sweep member, the movable member being arranged to be moved, when being pushed by the object in accordance with the advancing movement of the object with respect to the vehicle in the backward direction of the vehicle, in the backward direction of the vehicle from an engaging position where the engaging surface of the holding portion and the engaging portion of the engaging protrusion engage each other, so that the movable member is located at a non-engaging position where the engagement of the engaging surface of the holding portion and the engaging portion of the engaging protrusion is released, when the amount of advancement of the object in the backward direction of the vehicle exceeds the prescribed reference amount, wherein, in a state in which the movable member is located at the engaging position, the leg sweep member is held by and between the engaging protrusion and the structural member via the holding portion of the movable member so as to be fixed to the structural member, and wherein, when the movable member is moved to the non-engaging position, the holding of the leg sweep member between the engaging protrusion and the structural member is released, whereby the leg sweep member is released from the structural member.

(9) The installation structure according to the above feature (8), wherein the holding portion of the movable member of the fixing mechanism includes: a through-hole formed through a thickness of the holding portion in a vertical direction of the vehicle; and a cutout groove which is formed at a circumferential portion of the through-hole so as to extend in the backward direction of the vehicle with a prescribed length and open in the opposite surfaces of the holding portion a lower one of which constitutes the engaging surface, wherein the engaging protrusion of the fixing mechanism is constituted by a bolt member which is fastened to the structural member of the vehicle and which includes a leg portion that can be inserted through the cutout groove and a head portion that cannot be inserted through the cutout groove while can be inserted through the through-hole, the head portion constituting the engaging portion, wherein the leg sweep member includes an opening through which the head portion of the bolt member can be inserted, wherein, in the state in which the movable member is located at the engaging position, the leg portion of the bolt member is inserted through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and wherein the holding of the leg sweep member between the head portion of the bolt member and the structural member of the vehicle is released, whereby the movable member and the leg sweep member drop downward, when the head portion of the bolt member is located in the through-hole of the holding portion in accordance with the movement of the movable member in the backward direction of the vehicle from the engaging position to the non-engaging position when being pushed by the object.

(10) The installation structure according to the above feature (7), wherein the fixing mechanism is constituted by including: a fixing device which fixes the leg sweep member to the structural member of the vehicle; a detecting device which successively detects an amount of advancement of the object with respect to the vehicle in the backward direction of the vehicle from the position of the front end of the vehicle against which the object has hit upon the collision; and a releasing device which releases the fixation of the leg sweep member to the structural member of the vehicle by the fixing device when the amount of advancement detected by the detecting device exceeds the prescribed reference amount.

(11) The installation structure according to any one of the above features (7)-(10), further comprising a biasing device which is disposed between the leg sweep member and the structural member of the vehicle for biasing the leg sweep member in a downward direction.

(12) The installation structure according to any one of the above features (7)-(11), wherein the structural member of the vehicle is one of a radiator support, a cross member, and a side member.

(13) A front structure of a vehicle in which a leg sweep member for sweeping a leg portion of a pedestrian collided with a front end of the vehicle is disposed at a lower part of the front end of the vehicle so as to protrude frontward, wherein the leg sweep member is fixed to a structural member of the vehicle such that the leg sweep member is disposed at the lower part of the front end of the vehicle so as to protrude frontward, and wherein a fixing mechanism is provided which releases the fixation of the leg sweep member to the structural member of the vehicle when an object including the pedestrian which has collided with the front end of the vehicle advances, by an amount that exceeds a prescribed reference amount, with respect to the vehicle in a backward direction of the vehicle from a position of the front end of the vehicle against which the object has hit upon the collision.

In the vehicle front structure according to the above feature (13), the reference amount may be set to be the same as an amount of advancement of a portion (the leg portion) of the pedestrian at which the pedestrian has collided with the front end of the vehicle, in the backward direction of the vehicle in the event of the collision, for instance. In this case, the leg sweep member can be kept fixed to the vehicle structural member with high stability in the event of the collision of the pedestrian with the front end of the vehicle while, in the event of the light collision of the vehicle at its front end, the fixation of the leg sweep member to the structural member can be released with high reliability in accordance with the timing of the occurrence of the light collision, whereby the leg sweep member can be effectively separated from the front of the vehicle.

In the arrangement according to the above feature (13), the leg sweep member can exhibit its leg sweeping function in the collision of the pedestrian with the front end of the vehicle, advantageously assuring protection of the leg portion of the pedestrian. Further, in the event of the light collision of the vehicle at its front end, it is possible to effectively prevent the leg sweep member from coming into contact with various devices and equipment disposed at the front of the vehicle, with impact force generated upon the collision, thereby avoiding damages to the devices and the equipment with higher reliability.

(14) The front structure of a vehicle according to the above feature (13), wherein the fixing mechanism includes: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface thereof which is one of opposite surfaces of the holding portion remote from the leg sweep member, the movable member being arranged to be moved, when being pushed by the object in accordance with the advancing movement of the object with respect to the vehicle in the backward direction of the vehicle, in the backward direction of the vehicle from an engaging position where the engaging surface of the holding portion and the engaging portion of the engaging protrusion engage each other, so that the movable member is located at a non-engaging position where the engagement of the engaging surface of the holding portion and the engaging portion of the engaging protrusion is released, when the amount of advancement of the object in the backward direction of the vehicle exceeds the prescribed reference amount, wherein, in a state in which the movable member is located at the engaging position, the leg sweep member is held by and between the engaging protrusion and the structural member via the holding portion of the movable member so as to be fixed to the structural member, and wherein, when the movable member is moved to the non-engaging position, the holding of the leg sweep member between the engaging protrusion and the structural member is released, whereby the leg sweep member is released from the structural member.

(15) The front structure of a vehicle according to the above feature (14), wherein the holding portion of the movable member of the fixing mechanism includes: a through-hole formed through a thickness of the holding portion in a vertical direction of the vehicle; and a cutout groove which is formed at a circumferential portion of the through-hole so as to extend in the backward direction of the vehicle with a prescribed length and open in the opposite surfaces of the holding portion a lower one of which constitutes the engaging surface, wherein the engaging protrusion of the fixing mechanism is constituted by a bolt member which is fastened to the structural member of the vehicle and which includes a leg portion that can be inserted through the cutout groove and a head portion that cannot be inserted through the cutout groove while can be inserted through the through-hole, the head portion constituting the engaging portion, wherein the leg sweep member includes an opening through which the head portion of the bolt member can be inserted, wherein, in the state in which the movable member is located at the engaging position, the leg portion of the bolt member is inserted through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and wherein the holding of the leg sweep member between the head portion of the bolt member and the structural member of the vehicle is released, whereby the movable member and the leg sweep member drop downward, when the head portion of the bolt member is located in the through-hole of the holding portion in accordance with the movement of the movable member in the backward direction of the vehicle from the engaging position to the non-engaging position when being pushed by the object.

(16) The front structure of a vehicle according to the above feature (13), wherein the fixing mechanism is constituted by including: a fixing device which fixes the leg sweep member to the structural member of the vehicle; a detecting device which successively detects an amount of advancement of the object with respect to the vehicle in the backward direction of the vehicle from the position of the front end of the vehicle against which the object has hit upon the collision; and a releasing device which releases the fixation of the leg sweep member to the structural member of the vehicle by the fixing device when the amount of advancement detected by the detecting device exceeds the prescribed reference amount.

(17) The front structure of a vehicle according to any one of the above features (13)-(16), further comprising a biasing device which is disposed between the leg sweep member and the structural member of the vehicle for biasing the leg sweep member in a downward direction.

(18) The front structure of a vehicle according to any one of the above features (13)-(17), wherein the structural member of the vehicle is one of a radiator support, a cross member, and a side member.

(19) A vehicle bumper attached to a front of a vehicle and including a bumper cover that is disposed at a front end of the vehicle so as to protrude frontward, comprising:

a leg sweep member which is disposed inside of a lower part of the bumper cover so as to protrude frontward for sweeping a leg portion of a pedestrian collided with the front end of the vehicle; and a fixing mechanism which fixes the leg sweep member to a structural member of the vehicle and which releases the fixation of the leg sweep member to the structural member when an object including the pedestrian which has collided with the front end of the vehicle advances, by an amount that exceeds a prescribed reference amount, with respect to the vehicle in a backward direction of the vehicle from a position of the front end of the vehicle against which the object has hit upon the collision.

In the vehicle bumper constructed according to the above feature (19), the reference amount may be set to be the same as an amount of advancement of a portion (the leg portion) of the pedestrian at which the pedestrian has collided with the front end of the vehicle, in the backward direction of the vehicle in the event of the collision, for instance. In this case, the leg sweep member can be kept fixed to the vehicle structural member with high stability in the event of the collision of the pedestrian with the front end of the vehicle while, in the event of the light collision of the vehicle at its front end, the fixation of the leg sweep member to the structural member can be released with high reliability in accordance with the timing of the occurrence of the light collision, whereby the leg sweep member can be effectively separated from the front of the vehicle.

In the arrangement according to the above feature (19), the leg sweep member can exhibit its leg sweeping function in the collision of the pedestrian with the front end of the vehicle, advantageously assuring protection of the leg portion of the pedestrian. Further, in the event of the light collision of the vehicle at its front end, it is possible to effectively prevent the leg sweep member from coming into contact with various devices and equipment disposed at the front of the vehicle, with impact force generated upon the collision, thereby avoiding damages to the devices and the equipment with higher reliability.

(20) The vehicle bumper according to the above feature (19), wherein the fixing mechanism includes: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface thereof which is one of opposite surfaces of the holding portion remote from the leg sweep member, the movable member being arranged to be moved, when being pushed by the object in accordance with the advancing movement of the object with respect to the vehicle in the backward direction of the vehicle, in the backward direction of the vehicle from an engaging position where the engaging surface of the holding portion and the engaging portion of the engaging protrusion engage each other, so that the movable member is located at a non-engaging position where the engagement of the engaging surface of the holding portion and the engaging portion of the engaging protrusion is released, when the amount of advancement of the object in the backward direction of the vehicle exceeds the prescribed reference amount, wherein, in a state in which the movable member is located at the engaging position, the leg sweep member is held by and between the engaging protrusion and the structural member via the holding portion of the movable member so as to be fixed to the structural member, and wherein, when the movable member is moved to the non-engaging position, the holding of the leg sweep member between the engaging protrusion and the structural member is released, whereby the leg sweep member is released from the structural member.

(21) The vehicle bumper according to the above feature (20), wherein the holding portion of the movable member of the fixing mechanism includes: a through-hole formed through a thickness of the holding portion in a vertical direction of the vehicle; and a cutout groove which is formed at a circumferential portion of the through-hole so as to extend in the backward direction of the vehicle with a prescribed length and open in the opposite surfaces of the holding portion a lower one of which constitutes the engaging surface, wherein the engaging protrusion of the fixing mechanism is constituted by a bolt member which is fastened to the structural member of the vehicle and which includes a leg portion that can be inserted through the cutout groove and a head portion that cannot be inserted through the cutout groove while can be inserted through the through-hole, the head portion constituting the engaging portion, wherein the leg sweep member includes an opening through which the head portion of the bolt member can be inserted, wherein, in the state in which the movable member is located at the engaging position, the leg portion of the bolt member is inserted through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and wherein the holding of the leg sweep member between the head portion of the bolt member and the structural member of the vehicle is released, whereby the movable member and the leg sweep member drop downward, when the head portion of the bolt member is located in the through-hole of the holding portion in accordance with the movement of the movable member in the backward direction of the vehicle from the engaging position to the non-engaging position when being pushed by the object.

(22) The vehicle bumper according to the above feature (19), wherein the fixing mechanism is constituted by including: a fixing device which fixes the leg sweep member to the structural member of the vehicle; a detecting device which successively detects an amount of advancement of the object with respect to the vehicle in the backward direction of the vehicle from the position of the front end of the vehicle against which the object has hit upon the collision; and a releasing device which releases the fixation of the leg sweep member to the structural member of the vehicle by the fixing device when the amount of advancement detected by the detecting device exceeds the prescribed reference amount.

(23) The vehicle bumper according to any one of the above features (19)-(22), further comprising a biasing device which is disposed between the leg sweep member and the structural member of the vehicle for biasing the leg sweep member in a downward direction.

(24) The vehicle bumper according to any one of the above features (19)-(23), wherein the structural member of the vehicle is one of a radiator support, a cross member, and a side member.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

By referring to the accompanying drawings, there will be described in detail embodiments of the present invention.

Figure 1:
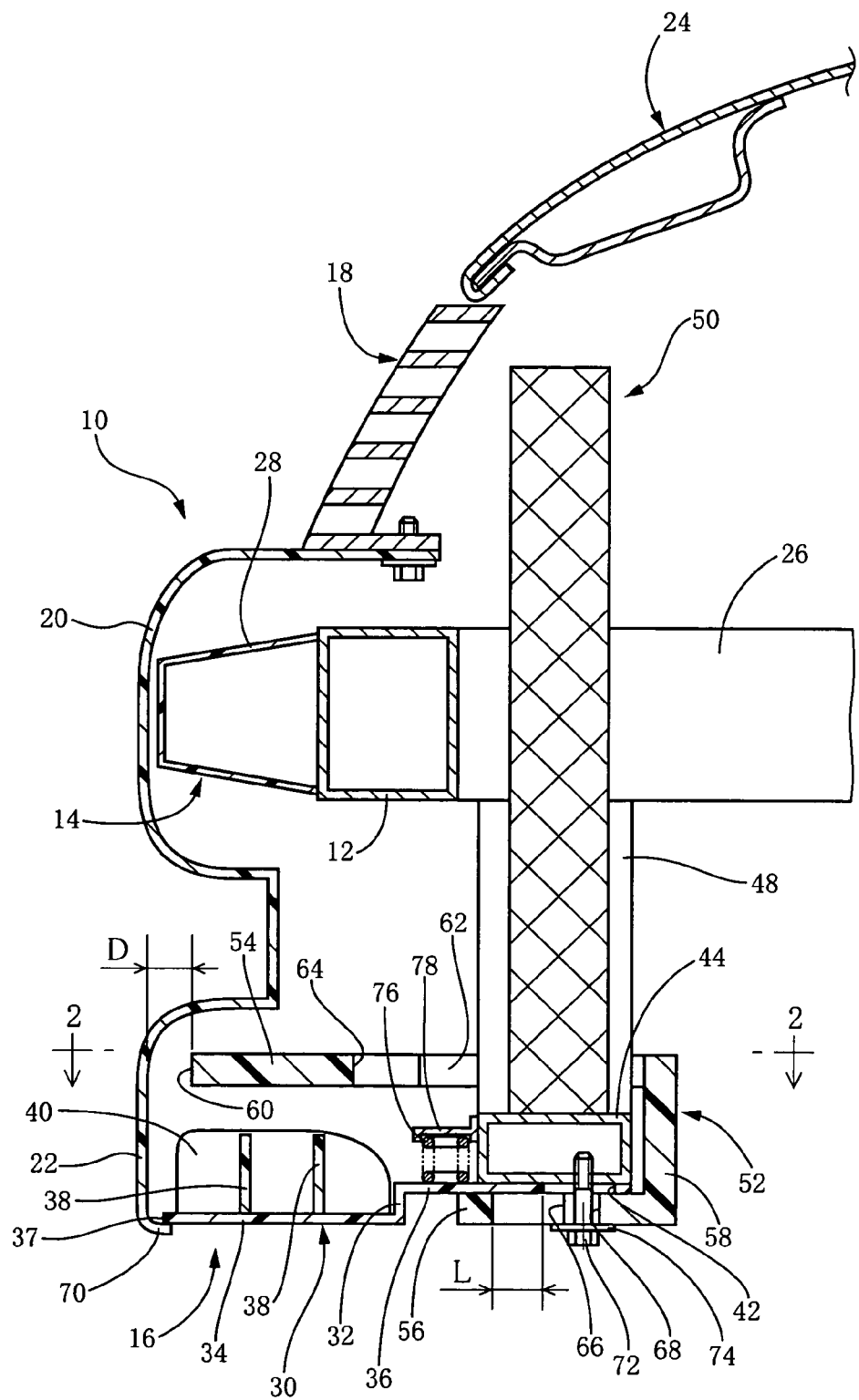
FIG. 1 is a vertical cross sectional view showing one example of a bumper having a structure according to the present invention, the view being taken along line 1-1 of FIG. 2.
Figure 2:
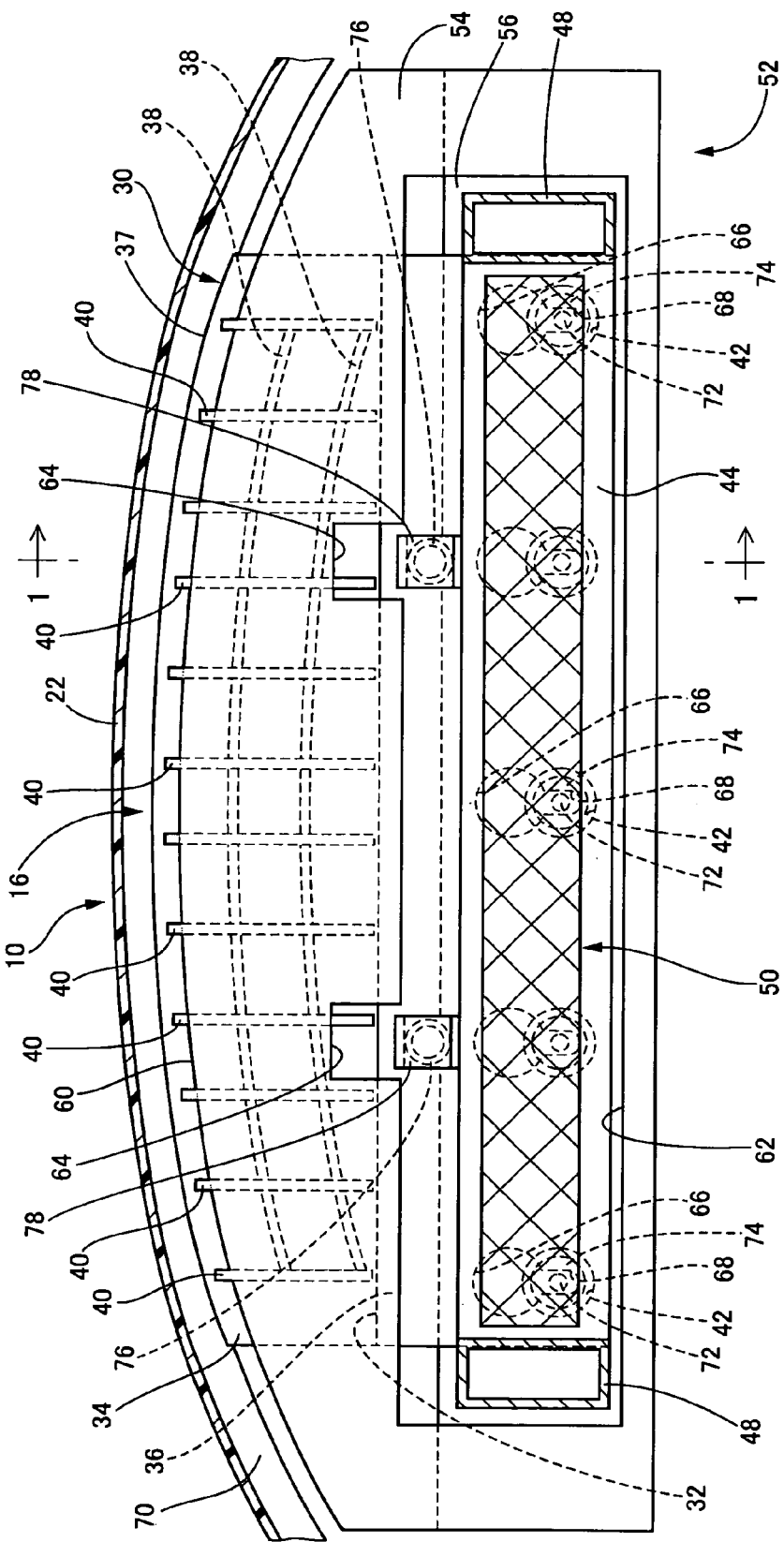
FIG. 2 is a cross sectional view taken along line 2-2 of FIG. 1.

Referring first to FIGS. 1 and 2, there is schematically shown, in vertical cross section and transverse cross section, respectively, a bumper as a pedestrian protection apparatus of the present invention attached to a front end of an automotive vehicle and constructed according to a first embodiment of the present invention. As apparent from FIGS. 1 and 2, the bumper of the exemplary first embodiment is constituted by including: a bumper cover 10; a bumper reinforcement 12 disposed inside of an upper part of the bumper cover 10 so as to be spaced apart therefrom by a suitable distance in a backward direction of the vehicle (i.e., in a rightward direction in FIG. 1 and a downward direction in FIG. 2); a shock-absorbing member 14 disposed between the upper part of the bumper cover 10 and the bumper reinforcement 12; and a leg sweep member 16 disposed inside of a lower part of the bumper cover 10.

Described more specifically, like a conventional bumper cover, the bumper cover 10 is formed of a soft synthetic resin material which permits easy deformation and which has a certain degree of elasticity (restoring property). The bumper cover 10 is disposed, while being curved, at the front end of the vehicle so as to continuously extend over the entire vehicle width in a vehicle width or lateral direction (i.e., in a direction perpendicular to the sheet plane of FIG. 1 and in a transverse direction in FIG. 2). The bumper cover 10 is fixed by bolts or the like to a front grille 18 forming the front end portion of the vehicle, for instance.

The upper part of the bumper cover 10 located frontward of the bumper reinforcement 12 with the shock-absorbing member 14 interposed therebetween is made, over the entire width thereof, as an upper protruding portion 20 which protrudes at the front end of the vehicle in a frontward direction (i.e., in a leftward direction in FIG. 1 and in an upward direction in FIG. 2). The lower part of the bumper cover 10 located frontward of the leg sweep member 16 is made, over the entire width thereof, as a lower protruding portion 22 which protrudes at the front end of the vehicle in the frontward direction. In FIG. 1, the reference numeral 24 denotes a bonnet.

The bumper reinforcement 12 is an extruded member made of aluminum and having a rectangular closed cross section structure, for instance. The bumper reinforcement 12 is disposed inside of the upper protruding portion 20 of the bumper cover 10 so as to extend over the substantially entire vehicle width in the vehicle width or lateral direction (i.e., in the direction perpendicular to the sheet plane of FIG. 1 and in the transverse direction in FIG. 2). The bumper reinforcement 12 is stretched between front end portions of a pair of front side members 26 which are disposed at widthwise opposite ends of the front of the vehicle so as to extend in a vehicle length or longitudinal direction, thereby giving a suitable degree of rigidity to the bumper. In FIG. 1, only one of the front side members 26 located on the right-hand side is shown.

The shock-absorbing member 14 disposed between the bumper reinforcement 12 and the upper protruding portion 20 of the bumper cover 10 is constituted by a plurality of thin-walled resin bodies 28 which are integrally connected to each other by a plurality of planar connecting bodies (not shown) made of synthetic resin. Each resin body 28 is a prismatic member having a closed end trapezoidal shape in vertical cross section. Here, each resin body 28 is made of an olefin resin material that permits easy buckling, such as synthetic resin including polypropylene, polyethylene, polybutene and the like, for instance. The thus constructed shock-absorbing member 14 is fixed to the bumper reinforcement 12 by resin clips (not shown) or the like formed integrally with the connecting bodies (not shown), such that the bottom portion of each resin body 28 is opposed to the inner surface of the upper protruding portion 20 of the bumper cover 10 and such that the tubular wall portion of each resin body 28 extend toward the inner surface of the upper protruding portion 20 of the bumper cover 10.

Figure 7:
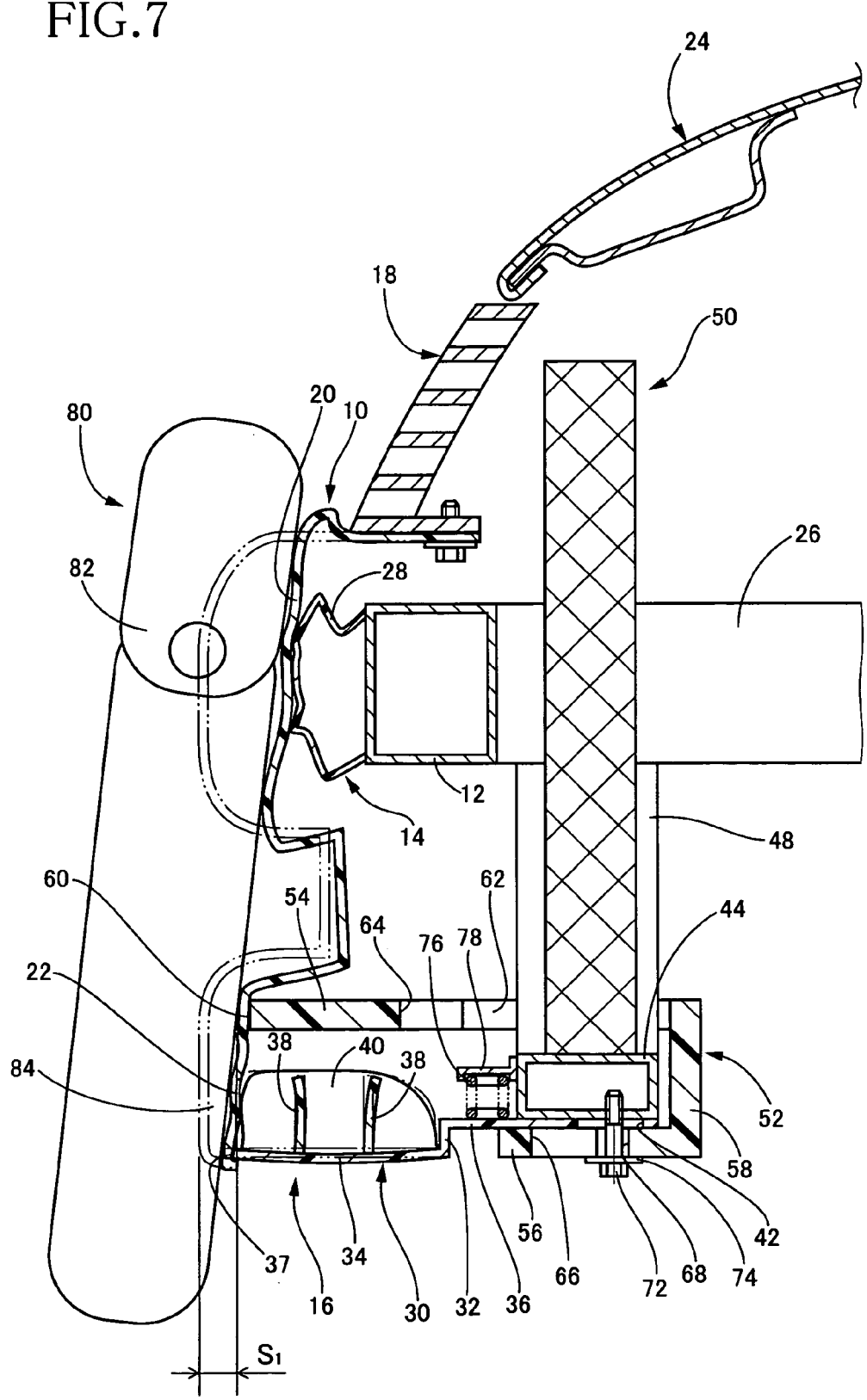
FIG. 7 is an explanatory view showing deformation states of a bumper cover, the leg sweep member and the movable member when a leg portion of a pedestrian comes into contact or collides with the bumper shown in FIG. 1.
Figure 8:
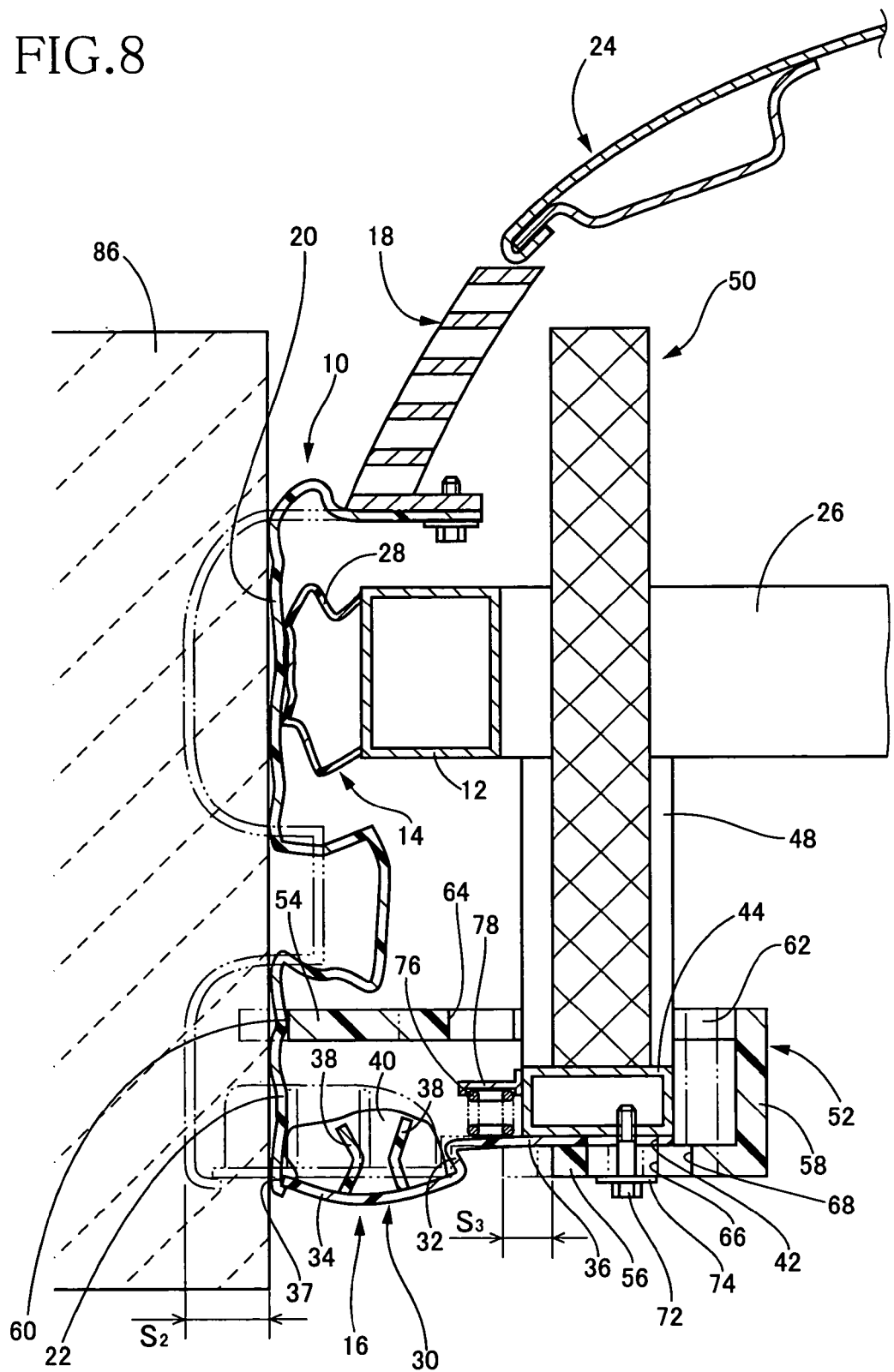
FIG. 8 is an explanatory view showing deformation states of the bumper cover, the leg sweep member and the movable member at a time point before an amount of advancement of an obstacle toward a vehicle reaches maximum in the event of a light collision of the obstacle with the bumper shown in FIG. 1.
Figure 9:
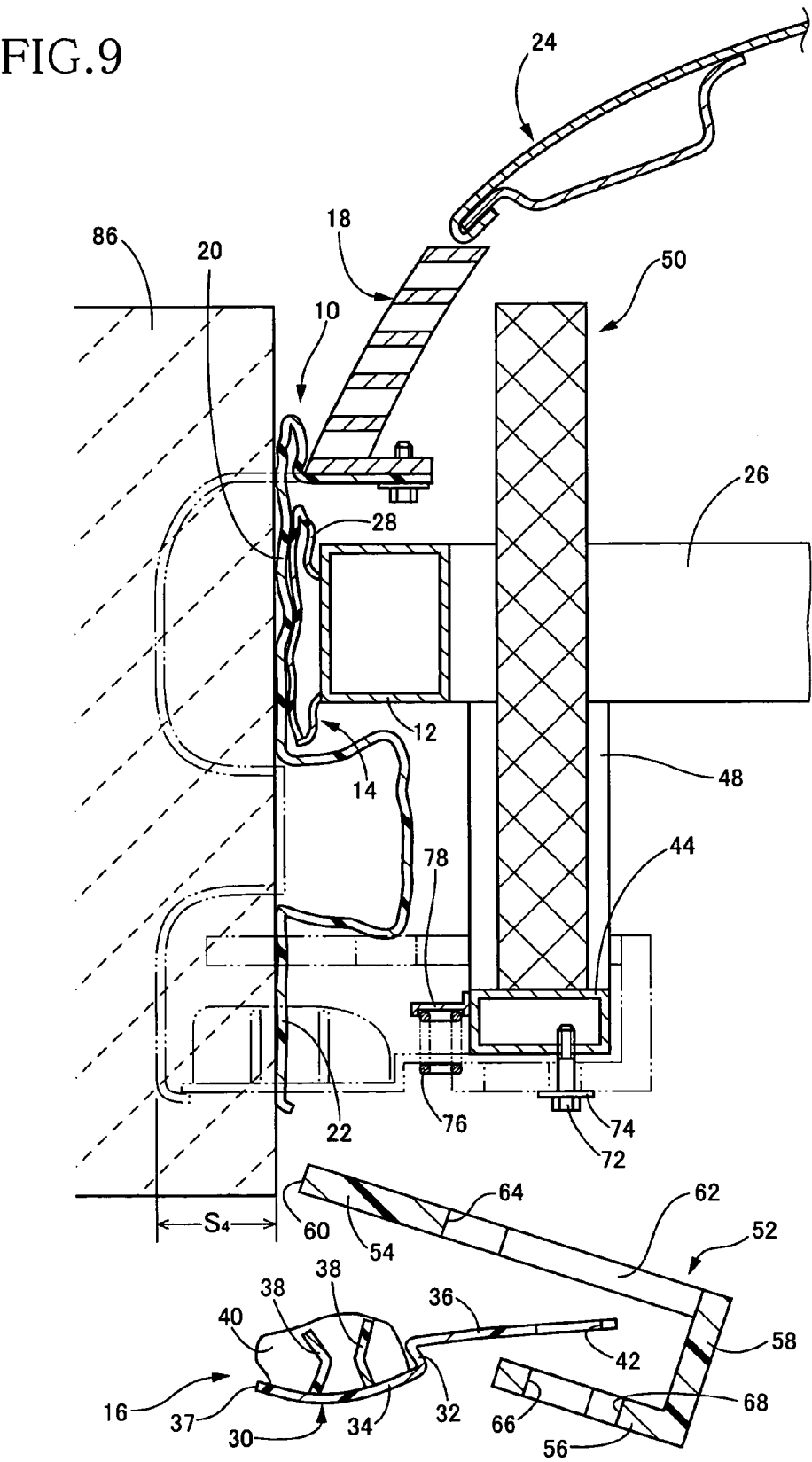
FIG. 9 is an explanatory view showing deformation states of the bumper cover, the leg sweep member and the movable member at a time point when the amount of advancement of the obstacle toward the vehicle reaches maximum in the event of the light collision of the obstacle with the bumper shown in FIG. 1.

In the bumper of the exemplary embodiment, when impact is inputted to the bumper cover 10 at the front of the vehicle in the backward direction thereof, the bumper cover 10 is deformed and the resin bodies 28 of the shock-absorbing member 14 are collapsed between the upper protruding portion 20 of the bumper cover 10 and the bumper reinforcement 12, whereby the resin bodies 28 are bent or buckled, so that the impact energy is absorbed by the shock-absorbing member (as shown in FIGS. 7-9).

Figure 3:
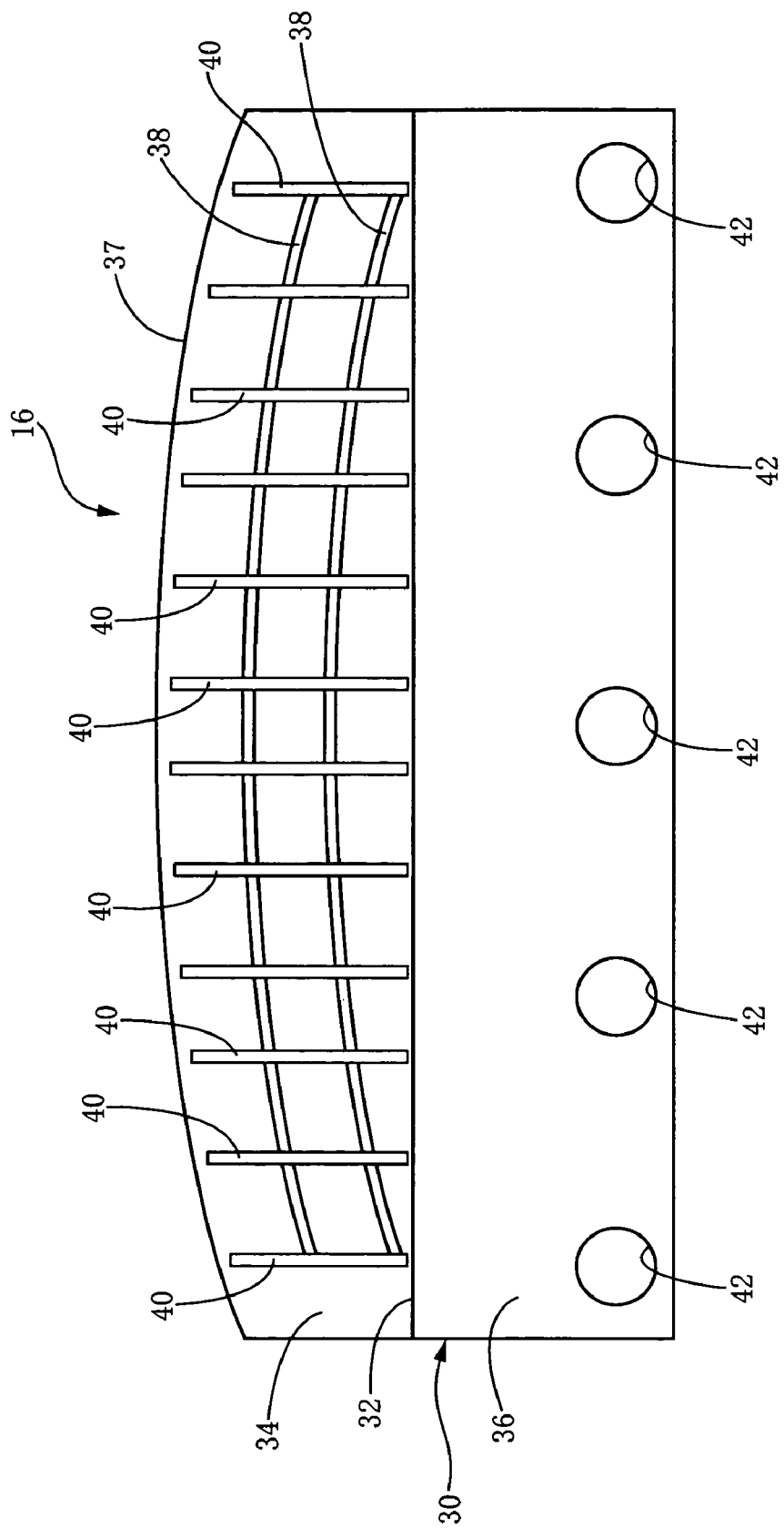
FIG. 3 is a plan view showing a leg sweep member disposed inside of the bumper of FIG. 1.

As shown in FIGS. 1-3, the leg sweep member 16 disposed inside of the lower protruding portion 22 of the bumper cover 10 has a base plate 30 having a rectangular shape and formed of a thin plate. The base plate 30 has a breadth or width dimension (as measured in the direction perpendicular to the sheet plane of FIG. 1 and in a transverse direction in FIG. 3) that is made smaller by a suitable amount by the length of the bumper cover 10 substantially corresponding to the vehicle width and a depth dimension (as measured in a transverse direction in FIG. 1 and in a vertical direction in FIG. 3) that is made sufficiently smaller than the breadth dimension thereof. When the leg sweep member 16 is installed on the vehicle, the breadth of the leg sweep member 16 corresponds to the vehicle width or lateral direction and the depth thereof corresponds to the vehicle length or longitudinal direction.

The base plate 30 has a stepped portion 32 formed at a generally middle portion as seen in the depth direction thereof so as to provide, on opposite sides of the stepped portion 32, an upper flat portion 36 and a lower flat portion 34. In other wards, a substantially half region of the base plate 30 located on one of opposite sides of the stepped portion 32 is made as the lower flat portion 34 whose height position is lower than that of another substantially half region of the base plate 30 located on the other of the opposite sides of the stepped portion 32 made as the upper flat portion 36.

In the base plate 30, an end surface of the lower flat portion 34 remote from the stepped portion 32 is made as an end curved surface 37 which is curved along the inner surface of the bumper cover 10. At an end portion of the upper flat portion 36 remote from the stepped portion 32 in the depth direction of the base plate 30, there are formed a plurality of circular openings 42 (five openings in the exemplary embodiment) having a large diameter and formed through the thickness of the end portion, so as to be equally spaced apart from each other in the breadth direction of the base plate 30.

Over the substantially entire upper surface of the lower flat portion 34 of the base plate 30, there are integrally provided: a plurality of long ribs 38 (here, two long ribs) each of which is a thin flat plate and which continuously extend in the breadth direction of the base plate 30; and a plurality of short ribs 40 (here, twelve short ribs) each of which is a thin flat plate and which continuously extend in the depth direction of the base plate 30. The long ribs 38 and the short ribs 40 are formed in a lattice so as to extend upright on the upper surface of the lower flat portion 34 of the base plate 30. The entirety of the leg sweep member 16 including the long ribs 38 and the short ribs 40 is formed of a synthetic resin material having a higher degree of rigidity than the resin bodies 28 of the shock-absorbing member 14. Thus, the leg sweep member 16 has a high degree of flexural rigidity, whereby the leg sweep member 16 has rigidity (strength to deformation) with respect to impact inputted thereto in its depth direction that is sufficiently higher than the rigidity of the shock-absorbing member 14 with respect to impact inputted thereto in the similar direction.

As shown in FIGS. 1 and 2, the thus constructed leg sweep member 16 is disposed inside of the lower protruding portion 22 of the bumper cover 10 with the end curved surface 37 of the lower flat portion 34 opposed to and spaced apart from the inner surface of the lower protruding portion 22 by a slight distance in the backward direction of the vehicle. Namely, the leg sweep member 16 is disposed inside of the bumper cover 10 which is located at the lower portion of the front end of the vehicle, so as to protrude frontward. The thus disposed leg sweep member 16 is fixed to a radiator support 44 that is fixedly positioned at the front of the vehicle. In the present embodiment, the fixation of the leg sweep member 16 to the radiator support 44 is realized by a special novel structure. As well known, the radiator support 44 is stretched between the lower end portions of respective side supports 48, 48 which are formed integrally with the respective front side members 26, 26 so as to extend from the lower surfaces thereof. The radiator support 44 supports a radiator 50 placed on its upper surface and is constituted as the structural member of the vehicle.

Figure 4:
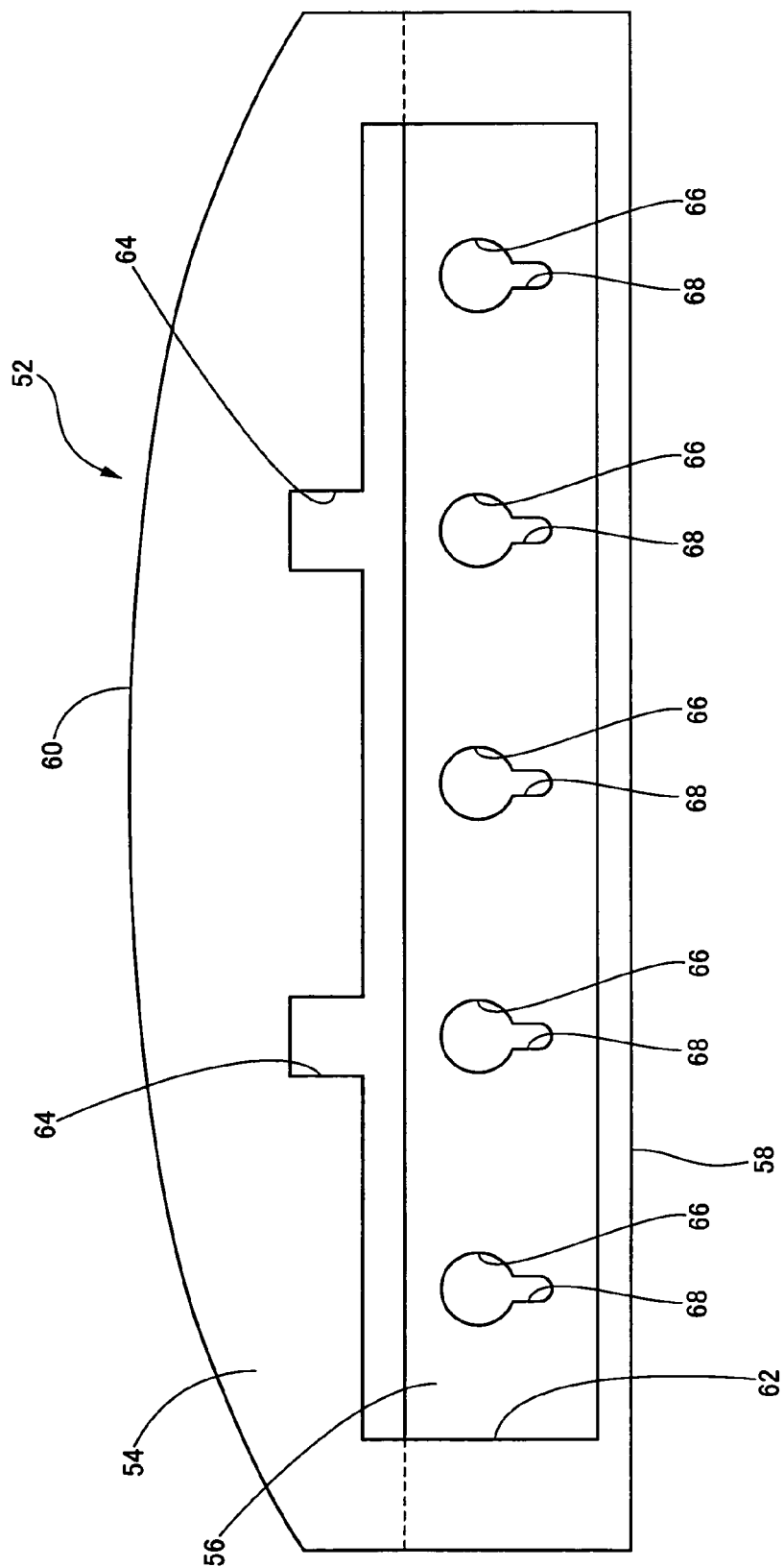
FIG. 4 is a plan view showing a movable member disposed inside of the bumper of FIG. 1.

In the bumper of this exemplary embodiment, the leg sweep member 16 is fixed to the radiator support 44 so as to be sandwiched by and between a movable member 52 and the radiator support 44. As shown in FIGS. 1, 2 and 4, the movable member 52 has a U-shaped cross sectional shape and includes an upper plate portion 54 and a lower plate portion 56 which are opposed to each other in the vertical direction with a suitable distance interposed therebetween and which are connected integrally to each other by a connecting plate portion 58. The movable member 52 has a thickness larger than that of the leg sweep member 16 and is made of a material whose rigidity is higher than that of the leg sweep member 16. For instance, the movable member 52 is made of a composite material such as resin that is reinforced by glass fiber, or a metal material.

The upper plate portion 54 of the movable member 52 is a rectangular flat plate having a breadth or width dimension (as measured in the direction perpendicular to the sheet plane of FIG. 1 and in a transverse direction in FIG. 4) which is made smaller by a suitable amount than the length of the bumper cover 10 substantially corresponding to the vehicle width and which is made larger by a suitable amount than the breadth of the base plate 30 of the leg sweep member 16, and a depth dimension (as measured in the transverse direction in FIG. 1 and in a vertical direction in FIG. 4) that is made sufficiently smaller than the breadth dimension thereof. The lower plate portion 56 is a rectangular flat plate having the same breadth or width direction as that of the upper plate portion 54 and a depth dimension that is smaller than that of the upper plate portion 54. When the movable member 52 is installed on the vehicle, the breadth of the movable member 52 corresponds to the vehicle width or lateral direction and the depth thereof corresponds to the vehicle length or longitudinal direction.

The upper plate portion 54 and the lower plate portion 56 opposed to each other in the vertical direction are connected integrally with each other by the connecting plate portion 58 that is disposed therebetween at one of opposite ends of the respective upper plate portion 54 and the lower plate portion 56 in the depth direction thereof. In other words, the connecting plate portion 58 extends upright with a height larger than that of the radiator support 44, and the upper plate portion 54 extends from the upper end of one surface of the connecting plate portion 58 as seen in its thickness direction while the lower plate portion 56 extends from the lower end of that one surface, whereby the movable member 52 is constituted as a unitary member consisting of the upper plate portion 54, the lower plate portion 56 and the connecting plate portion 58. In the thus formed movable member 52, an end surface of the upper plate portion 54 opposite to the connecting plate portion 58 is made as an end curved surface 60 which is curved along the inner surface of the bumper cover 10.

In the upper plate portion 54 of the movable member 52, there is formed a rectangular aperture 62 shown in FIG. 2 at a position of the upper plate portion 54 that is offset, by a suitable distance, from a mid point of the upper plate portion 54 as seen in the depth direction toward the connecting plate portion 58, i.e., from a mid point of the upper plate portion 54 as seen in the direction of extension from the connecting plate portion 58. The aperture 62 has a dimension as measured in the breadth direction of the upper plate portion 54 that is made larger than a dimension thereof as measured in the depth direction of the same 54. The aperture has a size large enough to permit insertion of the side supports 48, 48 and the radiator support 44 stretched between the lower end portions of the side supports 48, 48 therethrough. Further, the aperture 62 has two rectangular recessed portions 64 which are formed at respective positions thereof located on the side of the end curved surface 60, such that the two recessed portions 64 are spaced apart from each other in the breadth direction of the upper plate portion 54.

In the lower plate portion 56 of the movable member 52, there are formed circular through-holes 66 formed through its thickness, so as to be equally spaced apart from each other in the breadth direction of the lower plate portion 56. The number of the through-holes 66 formed in the lower plate portion 56 is the same as that of the circular openings 42 formed in the upper flat portion 36 of the leg sweep member 16, namely five in this embodiment. The size (diameter) of the through-holes 66 is the same as that of the circular openings 42. The intervals at which the through-holes 66 are spaced apart from each other are the same as those at which the circular openings 42 are spaced apart from each other. Each of the through-holes 66 has a cutout groove 68 formed at a circumferential portion thereof located on the side of the connecting plate portion 58 so as to extend, with a suitable length, straightly in a direction from the end curved surface 60 toward the connecting plate portion 58. Each cutout groove 68 is open in opposite surfaces (upper and lower surfaces) of the lower plate portion 56.

Thus, in this embodiment, the leg sweep member 16 constructed as described above is disposed inside of the lower protruding portion 22 of the bumper cover 10 which is disposed at the lower portion of the front end of the vehicle, such that the upper surface of the upper flat portion 36 is held in contact with the lower surface of the radiator support 44 and such that the lower flat portion 34 is located at a height position lower than the lower surface of the radiator support 44 so as to protrude frontward, with the end of the lower flat portion 34 on the side of the end curved surface 37 placed on an inward flange 70 formed integrally with a lower end of the lower protruding portion 22 of the bumper cover 10.

As shown in FIG. 1, the movable member 52 is disposed inside of the lower protruding portion 22 of the bumper cover 10 such that the lower portions of the side supports 48, 48 and the lower portion of the radiator 50 held by the radiator support 44 are inserted through the aperture 62 and such that the lower plate portion 56 is positioned under the radiator support 44, whereby the upper flat portion 36 of the leg sweep member 16 is sandwiched by and between the lower plate portion 56 of the movable member 52 and the radiator support 44.

In the thus disposed movable member 52, the end curved surface 60 of the upper plate portion 54 is opposed, above the lower flat portion 34 of the leg sweep member 16, to the inner surface of the lower protruding portion 22 of the bumper cover 10 with a spacing distance therebetween (a dimension indicated by D in FIG. 1) that is greater by a suitable amount than the spacing distance between the inner surface of the lower protruding portion 22 and the end curved surface 37 of the leg sweep member 16. Further the through-holes 66 of the lower plate portion 56 are located so as to be offset frontward from the corresponding circular openings 42 of the leg sweep member 16 by a suitable dimension (indicated by L in FIG. 1), so that the cutout grooves 68 formed in the respective through-holes 66 are in communication with the corresponding circular openings 42.

Figure 5:
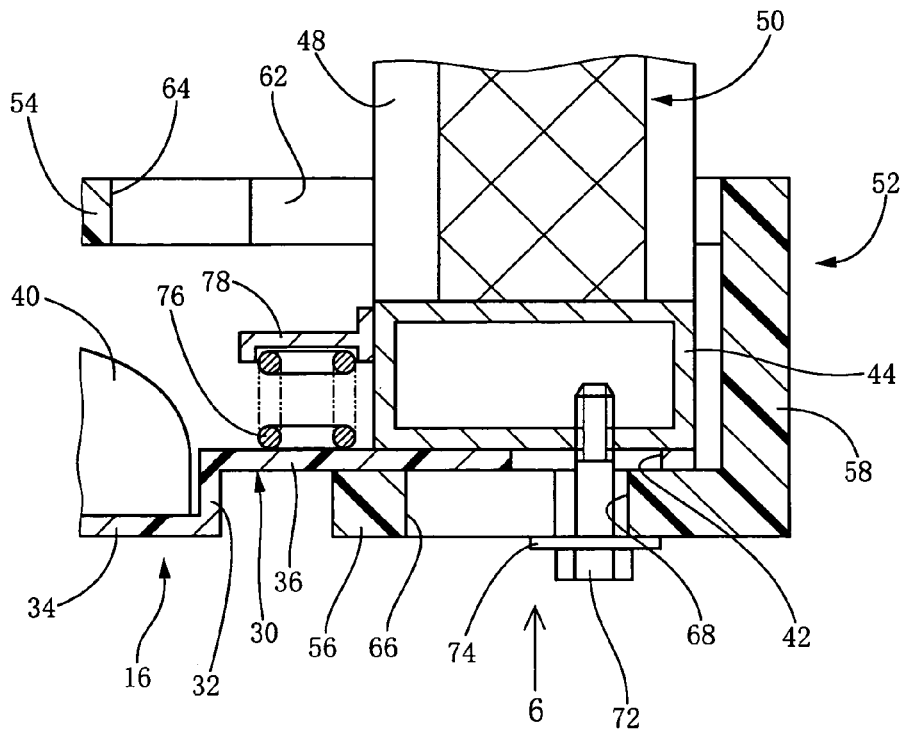
FIG. 5 is an enlarged view of a portion of FIG. 1.
Figure 6:
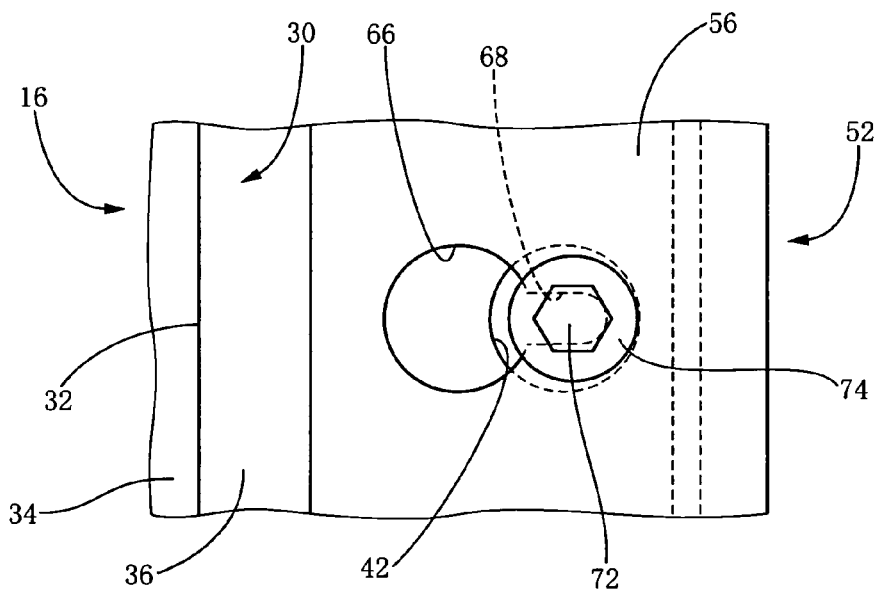
FIG. 6 is a view as seen from a direction indicated by an arrow 6 in FIG. 5.

As shown in FIGS. 5 and 6, in the state in which the leg sweep member 16 and the movable member 52 are disposed as described above, a plurality of fixing bolts 72 are screwed at their leg portions into the radiator support 44, such that the fixing bolts 72 are inserted into the corresponding cutout grooves 68 of the movable member 52 and the corresponding circular openings 42 of the leg sweep member 16 that are held in communication with each other, from the underside of the lower plate portion 56. Onto the leg portion of each fixing bolt 72 fixed to the radiator support 44, there is fitted a washer 74 whose size is larger than the opening size of each cutout groove 68 and the size of the head portion of each fixing bolt 72 and whose outside diameter is smaller than the inside diameter of the circular openings 42 and the through-holes 66. The washer 74 is held in engagement with the head portion of the corresponding fixing bolt 72 so as to be in contact with the peripheral portion of the corresponding cutout groove 68 formed in the lower plate portion 56 of the movable member 52.

Thus, the plurality of fixing bolts 72 are fixed to the radiator support 44 so as to protrude form the lower surface of the radiator support 44 by a suitable distance. Each washer 74 is disposed at a top end portion of the corresponding fixing bolt 72 such that the washer 74 extends radially outwardly from an outer circumferential surface of a proximal end of the leg portion of the corresponding fixing bolt 72 so as to provide a flange-like configuration. Each washer 74 engages the lower surface of the lower plate portion 56 of the movable member 52 by clamping force of the fixing bolt 72.

According to this arrangement, the lower plate portion 56 of the movable member 52 and the upper flat portion 36 of the leg sweep member 16 are held and sandwiched by and between the upper surface of the washers 74 disposed at the top end portions of the respective fixing bolts 72 and the lower surface of the radiator support 44, whereby the leg sweep member 16 is fixed to the radiator support 44 by the fixing bolts 72 and the washers 74 so as to be sandwiched by and between the radiator support 44 and the movable member 52, such that the leg sweep member 16 disposed inside of the lower protruding portion 22 of the bumper cover 10 protrudes frontward at the front end of the vehicle. In this state, the entirety of each washer 74 is located within the corresponding circular opening 42 of the leg sweep member 16 in plan view, via the lower plate portion 56 of the movable member 52.

As apparent from the foregoing description, in the present embodiment, each fixing bolt 72 constitutes an engaging protrusion while the head portion of each fixing bolt 72 and each washer 74 constitute an engaging portion. Further, the lower plate portion 56 of the movable member 52 constitutes a holding portion while the lower surface of the lower plate portion 56 constitutes an engaging surface. In this connection, where the head portion of each fixing bolt 72 has a size that permits reliable engagement thereof with the lower surface of the lower plate portion 56 of the movable member 52, the washers 74 may be eliminated and such a head portion of the fixing bolt 72 may constitute the engaging portion.

With the leg sweep member 16 fixed to the radiator support 44 as described above, the movable member 52 is held, at its lower plate portion 56, by and between the lower surface of the upper flat portion 36 of the leg sweep member 16 and the upper surfaces of the washers 74 disposed at the top end portions of the respective fixing bolts 72 fixed to the radiator support 44. In this arrangement, therefore, when the end curved surface 60 of the upper plate portion 54 of the movable member 52 is pushed in the backward direction of the vehicle, the upper surface and the lower surface of the lower plate portion 56 of the movable member 52 slide with respect to the lower surface of the upper flat portion 36 of the leg sweep member 16 and the upper surfaces of the washers 74, respectively, so that the entirety of the movable member 52 is moved in the backward direction.

As apparent from FIGS. 1 and 2, there are provided compression coil springs 76 each as a biasing device on the upper surface of the upper flat portion 36 of the leg sweep member 16 fixed to the radiator support 44. The compression coil springs 76 are held, in a preliminarily compression state, by and between respective rectangular pressing members 78 formed integrally with the radiator support 44 and the upper flat portion 36 of the leg sweep member 16, whereby the upper flat portion 36 of the leg sweep member 16 and the lower plate portion 56 of the movable member 52 which cooperates with the radiator support 44 to hold the upper flat portion 36 therebetween are biased downward based on restoring force (biasing force) of the compression coil springs 76. In this connection, the pressing members 78 which cooperate with the leg sweep member 16 to hold the compression coil springs 76 therebetween are formed at respective positions of the radiator support 44 corresponding to the two recessed portions 64 formed in the aperture 62 of the movable member 52. Each pressing member 78 has a size somewhat smaller than the recessed portions 64.

In the bumper constructed according to the present embodiment, the shock-absorbing member 14 is disposed inside of the upper protruding portion 20 of the bumper cover 10. Further, the leg sweep member 16 whose rigidity is higher than that of the shock-absorbing member 14 is disposed inside of the lower protruding portion 22 of the bumper cover 10. Further, the movable member 52 whose rigidity is higher than that of the leg sweep member 16 is also disposed inside of the lower protruding portion 22 so as to be slidably movable in the backward direction of the vehicle. As shown in FIG. 7, the upper protruding portion 20 of the bumper cover 10 is located at a height position where the vicinity of a knee 82 of a leg portion 80 of the pedestrian comes into contact therewith upon occurrence of a minor collision between a pedestrian and the vehicle while the lower protruding portion 22 is located at a height position where the vicinity of a shank 84 of the leg portion 80 of the pedestrian comes into contact therewith upon occurrence of the minor collision.

In the thus constructed bumper, when the leg portion 80 of the pedestrian comes into contact or collides with the bumper cover 10, the upper and lower protruding portions 20, 22 of the bumper cover 10 are deformed (moved or displaced) in the backward direction of the vehicle due to impact upon the contact thereof with the vicinity of the knee 82 and the vicinity of the shank 84, respectively, so that the shock-absorbing member 14 and the leg sweep member 16 respectively disposed inside of the upper and lower protruding portions 20, 22 are deformed (moved or displaced) in the backward direction of the vehicle. In this instance, because the rigidity of the shock-absorbing member 14 is lower than that of the leg sweep member 16, the shock-absorbing member 14 is deformed by an amount larger than an amount by which the leg sweep member 16 is deformed. Accordingly, the bumper cover 10 is deformed into a configuration in which the lower protruding portion 22 protrudes further forward of the vehicle than the upper protruding portion 20, so that the vicinity of the shank 84 of the leg portion 80 of the pedestrian is scooped up by the leg sweep member 16 via the lower protruding portion 22 of the bumper cover 10, whereby the pedestrian falls down toward or is thrown over the bonnet 24 of the vehicle. In consequence, the bending of the knee 82 of the pedestrian in the unnatural or undesirable direction is limited, thereby minimizing occurrence of injuries to the knee 82 such as bone fractures and assuring protection and safety of the pedestrian.

Here, the distance between the inner surface of the lower protruding portion 22 of the bumper cover 10 and the end curved surface 60 of the movable member (i.e., the dimension indicated by D in FIG. 1) is set in advance to be substantially equal to or larger, by a suitable amount, than a maximum deformation or displacement amount (i.e., a dimension indicated by $S_1$ in FIG. 7) of the lower protruding portion 22 of the bumper cover 10 in the backward direction when the pedestrian comes into contact or collide with the bumper cover 10. Therefore, when the pedestrian comes into contact with the bumper cover 10, the movable member 52 is designed so as not to be pushed in the backward direction by the deformed lower protruding portion 22.

In the bumper constructed as described above, upon occurrence of the light collision of the vehicle at its front end with a sturdy obstacle (object) 86 having a larger weight than the pedestrian during running of the vehicle at a relatively-low speed, the impact force (impact energy) larger than that upon contact with the leg portion 80 of the pedestrian is inputted to the upper and lower protruding portions 20, 22 of the bumper cover 10, so that the upper and lower protruding portions 20, 22 are deformed in the backward direction of the vehicle in respective amounts considerably larger than those upon contact thereof with the leg portion 80 of the pedestrian.

Therefore, in the even of the light collision of the vehicle at its front end, the shock-absorbing member 14 and the leg sweep member 16 respectively disposed inside of the upper and lower protruding portions 20, 22 of the bumper cover 10 are deformed in the backward direction in respective amounts larger than those upon contact of the pedestrian with the bumper cover 10. In this instance, the leg sweep member 16 is somewhat deformed but is not bent to an excessive extent into a dogleg shape, for instance, because of its high rigidity, whereby the leg sweep member 16 is prevented from coming into contact, at a part thereof, with the radiator 50 and so on.

Here, in the process of deformation of the lower protruding portion 22 of the bumper cover 10 in the backward direction upon occurrence of the light collision of the vehicle at its front end, when an amount of deformation of the lower protruding portion 22 (i.e., a dimension indicated by $S_2$ in FIG. 8) exceeds the distance between the inner surface of the lower protruding portion 22 and the end curved surface 60 of the movable member 52 (i.e., the dimension indicated by D in FIG. 1), the upper plate portion 54 of the movable member 52 is pushed backward by the deformed lower protruding portion 22 of the bumper cover 10. As a result, the upper surface and the lower surface of the lower plate portion 56 of the movable member 52 respectively slide with respect to the lower surface of the upper flat portion of the leg sweep member 16 and the upper surfaces of the washers 74, so that the entirety of the movable member 52 is moved in the backward direction.

Figure 10:
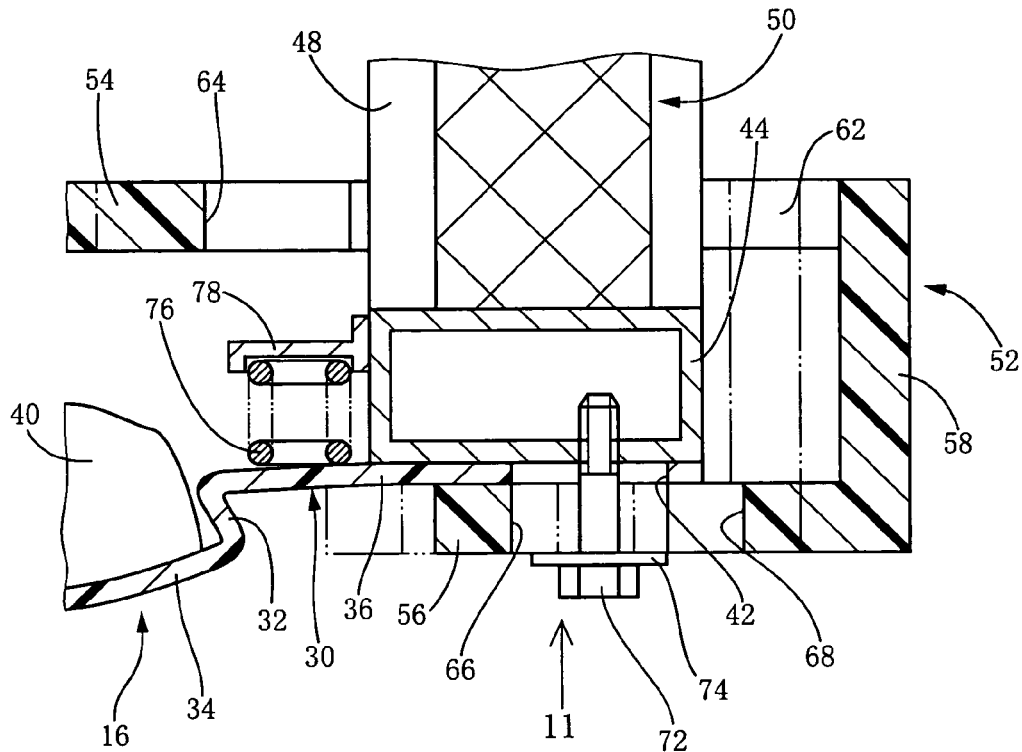
FIG. 10 is an enlarged view showing a portion of FIG. 8.
Figure 11:
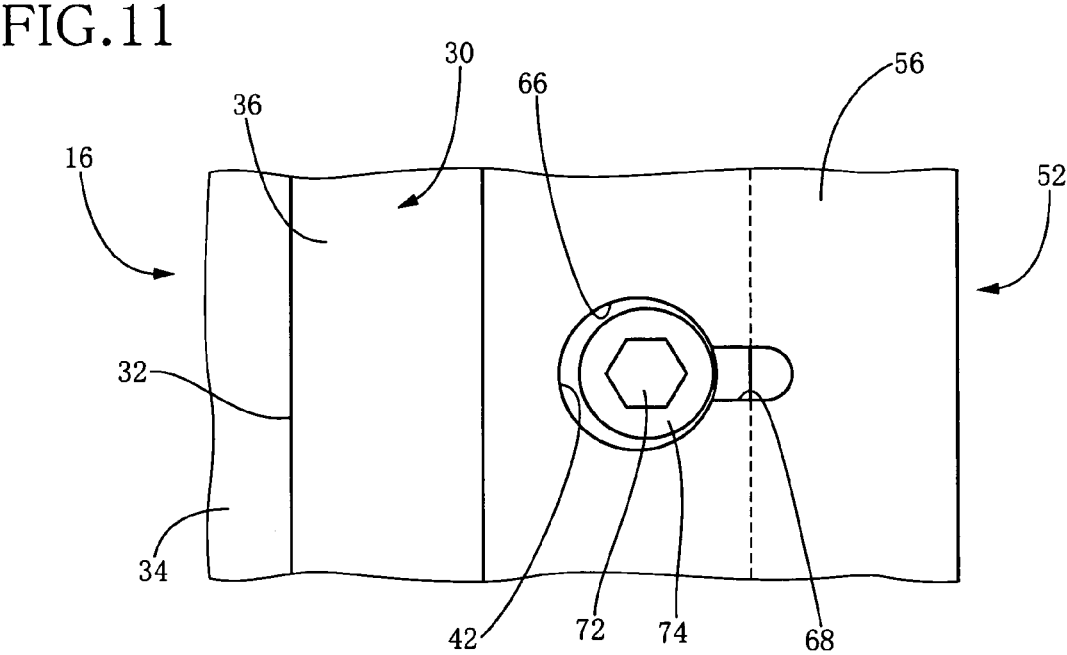
FIG. 11 is a view as seen from a direction indicated by an arrow 11 of FIG. 10.

As shown in FIGS. 8, 10 and 11, when an amount of movement of the movable member 52 in the backward direction (i.e., a dimension indicated by $S_3$ in FIG. 8) due to deformation of the lower protruding portion 22 of the bumper cover 10 upon occurrence of the light collision becomes equal to an amount of offset of each through-hole 66 of the movable member 52 from each circular opening 42 of the leg sweep member 16 in the forward direction (i.e., the dimension indicated by L in FIG. 1), the through-holes 66 of the movable member 52 and the circular openings 42 of the leg sweep member 16 having the same diameter are situated coaxially relative to each other. In this instance, the leg portion of each of the fixing bolts 72 that are fixed to the radiator support 44 and the entirety of each washer 74 fitted on the corresponding leg portion are located inside of the corresponding through-hole 66 and circular opening 42 situated coaxially relative to each other, whereby the engagement of each washer 74 with respect to the lower surface of the lower plate portion 56 of the movable member 52 is released.

Thus, the holding of the leg sweep member 16 and the movable member 52 between the upper surface of each washer 74 and the lower surface of the radiator support 44 is released, whereby the fixation of the leg sweep member 16 to the radiator support 44 via the movable member 52 is released while, at the same time, the holding of the movable member 52 between the leg sweep member 16 and the washers 74 of the fixing bolts 72 are released.

With the thus constructed bumper of the present embodiment mounted on the front end of the vehicle, the fixation of the leg sweep member 16 to the radiator support 44 via the movable member 52 can be maintained with high stability when the lower protruding portion 22 of the bumper cover 10 is deformed in the backward direction of the vehicle by the maximum deformation amount (i.e., the dimension indicated by $S_1$ in FIG. 7) due to contact of the leg portion 80 of the pedestrian with respect to the bumper cover 10, in other words, when the leg portion 80 of the pedestrian advances, by a maximum amount, in the backward direction from the position of the forward end of the lower protruding portion 22 of the bumper cover 10.

Upon occurrence of the light collision of the obstacle 86 with the bumper cover 10, the fixation or holding of the leg sweep member 16 and the movable member 52 with respect to the radiator support 44 is released and these members 16, 52 drop by their own weights when the amount of deformation of the lower protruding portion 22 of the bumper cover 10 in the backward direction of the vehicle, in other words, an amount of advancement of the obstacle 86 with respect to the vehicle in the backward direction from the position of the forward end of the lower protruding portion 22 of the bumper cover 10 (i.e., the dimension indicated by $S_2$ in FIG. 8) becomes equal to the amount of offset of each through-hole 66 of the movable member 52 from each circular opening 42 in the frontward direction (i.e., the dimension indicated by L in FIG. 1), beyond the maximum amount of advancement of the pedestrian toward the vehicle upon contact thereof with the bumper cover 10 (i.e., the dimension indicated by $S_1$ in FIG. 7).

At a time point when the obstacle 86 advances with respect to the vehicle by a maximum amount (i.e., a dimension indicated by $S_4$ in FIG. 9) as shown in FIG. 9, the leg sweep member 16 and the movable member 52 have already been separated from the front of the vehicle. As apparent from the description, the movable member 52, the fixing bolts 72 and the washer 74 constitute a fixing device in the exemplary embodiment. Further, the maximum deformation amount of the lower protruding portion 22 of the bumper cover 10 upon contact of the leg portion 80 of the pedestrian with respect to the bumper cover 10, namely, the maximum amount of advancement of the pedestrian toward the vehicle upon contact thereof with respect to the bumper cover 10 (i.e., the dimension indicated by $S_1$ in FIG. 7) is a prescribed reference amount.

In the present embodiment, the leg sweep member 16 and the movable member 52 are biased downward by the compression coil springs 76 provided between the leg sweep member 16 and the pressing members 78 formed integrally with the radiator support 44. Accordingly, the leg sweep member 16 and the movable member 52 are arranged to quickly drop with high reliability based on the biasing force of the compression coil springs 76 before the amount of advancement of the obstacle 86 toward the vehicle reaches maximum upon occurrence of the light collision of the vehicle at its front end. Moreover, upon dropping of the movable member 52, the radiator support 44, the side supports 48, the radiator 50 and the pressing members 78 pass through the aperture 62 and the recessed portions 64 formed in the upper plate portion 54 of the movable member 52, whereby the movable member 52 can drop without being interfered by those components 44, 48, 50, 78.

Accordingly, in the bumper constructed as described above, the leg sweep member 16 exhibits, with high reliability, its leg sweeping function upon collision or contact of the leg portion 80 of the pedestrian with the front end of the vehicle, so that the leg portion 80 of the pedestrian collided with the front end of the vehicle can be more effectively protected. In addition, upon occurrence of the light collision of the vehicle at its front end, it is possible to prevent the leg sweep member 16 from coming into contact with the components and the equipment such as the radiator 50 disposed at the front of the vehicle, with impact force generated upon the collision. Therefore, the components and the equipment such as the radiator 50 are not damaged by the leg sweep member 16, and the vehicle is free from a fear of suffering from serious damages such as inability to run arising from damages to the radiator 50 and so on in a case of the light collision in which the vehicle body is not damaged so much.

In the present embodiment, the movable member 52 made of synthetic resin is held by the radiator support 44 by means of the fixing bolts 72 fastened to the radiator support 44 and the washers 74 fitted on the respective fixing bolts 72, such that the movable member 52 is movable in the backward direction of the vehicle in accordance with the deformation of the lower protruding portion 22 due to the impact inputted to the bumper cover 10. Further, the leg sweep member 16 is held by and between the thus arranged movable member 52 and the radiator support 44. Accordingly, with such a relatively simple structure using the movable member 52 formed of the inexpensive material, the aforementioned excellent advantages and effects can be obtained with high stability and reliability.

Further, in the present embodiment, the movable member 52 is constituted by including the upper plate portion 54 and the lower plate portion 56 whose depth dimension is smaller than that of the upper plate portion 54 while the leg sweep member 16 has a stepped structure including the upper flat portion 36 and the lower flat portion 34. The leg sweep member 16 is fixed to the radiator support 44 such that the upper flat portion 36 is held by and between the lower plate portion 56 of the movable member 52 and the radiator support 44 and such that the lower flat portion 34 extends frontward of the lower plate portion 56 of the movable member 52 with the lower flat portion 34 located further frontward than the upper flat portion 36. Therefore, by suitably designing the height difference between the upper and lower flat portions 34, 36, the lower flat portion 34 can be located at a height position that is substantially equal to, or lower than, that of the lower plate portion 56 of the movable member 52, whereby the lower flat portion 34 can be disposed, inside of the lower protruding portion 22 of the bumper cover 10, at the height position that is as low as possible. Therefore, upon contact of the leg portion 80 of the pedestrian with the bumper cover 10, the leg sweep member 16 comes into contact with, via the lower protruding portion 22 of the bumper cover 10, a part of the leg portion 80 that is well below the knee 82. Accordingly, the leg sweep member 16 exhibits, with high reliability, its leg sweeping function, assuring protection of the leg portion 80 of the pedestrian more effectively.

Figure 12:
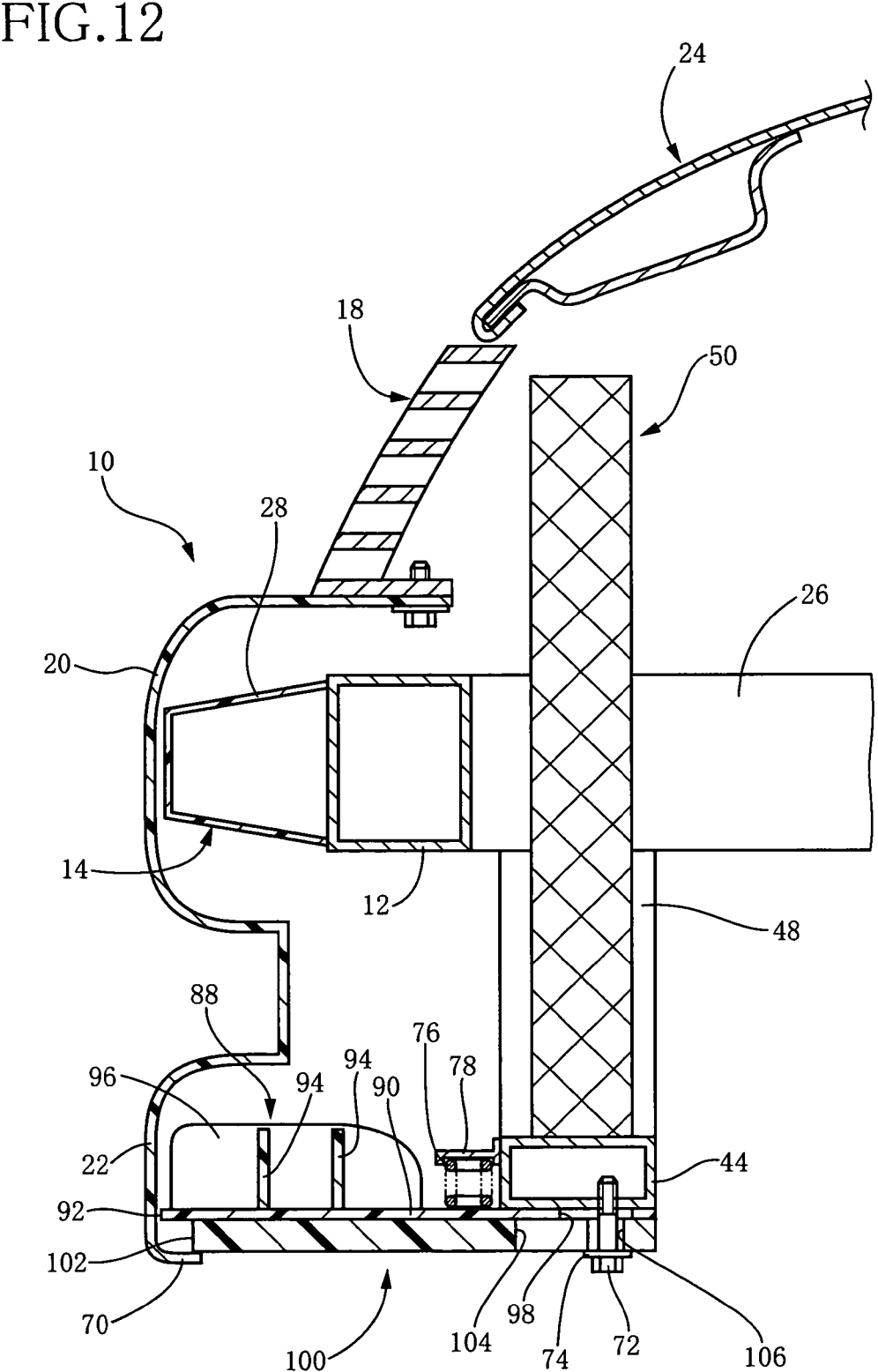
FIG. 12 is a view showing another example of the bumper according to the present invention, the view corresponding to FIG. 1.
Figure 13:
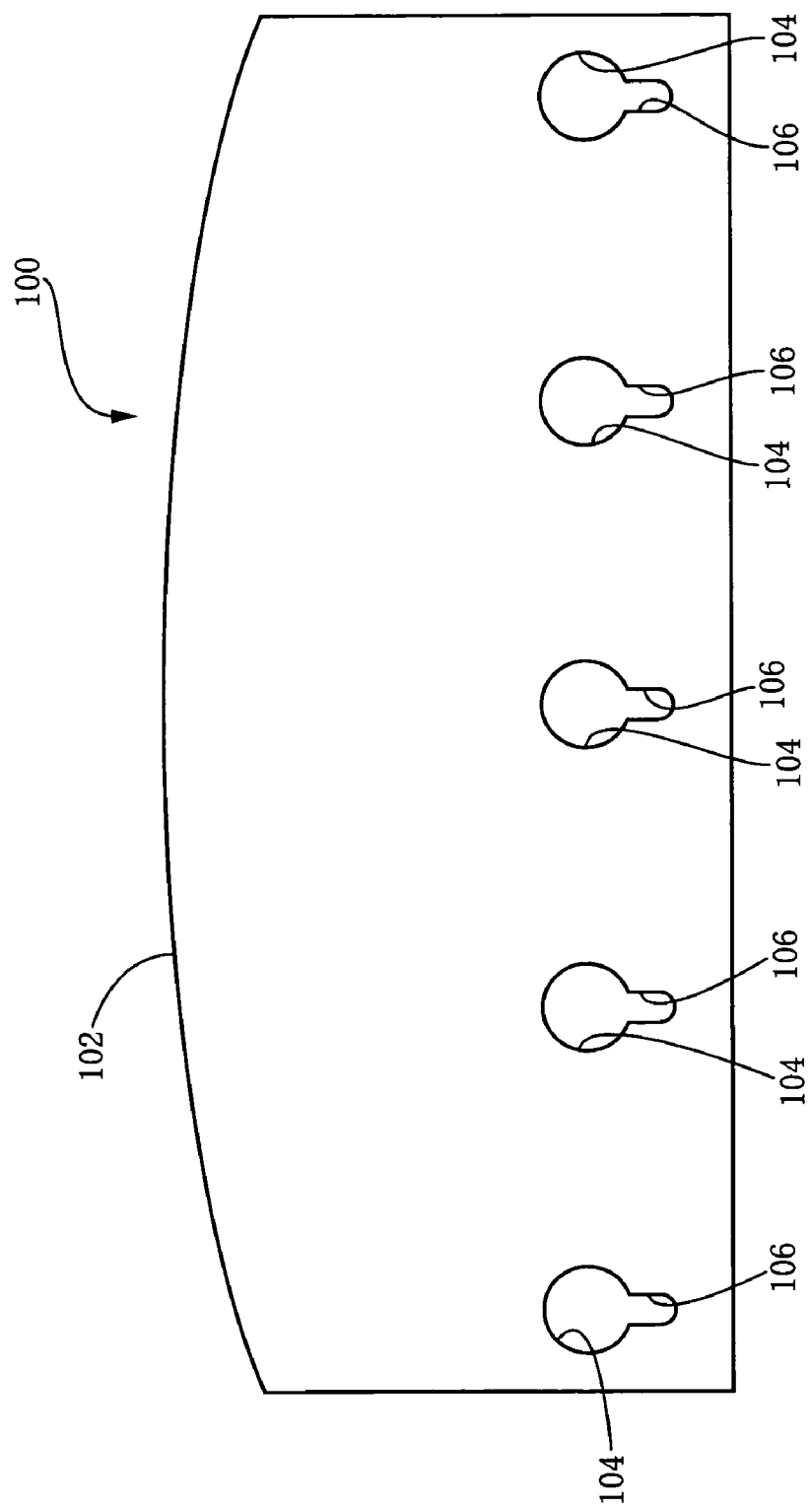
FIG. 13 is a plan view showing a movable member disposed inside of the bumper of FIG. 12.

Referring next to FIGS. 12 and 13, there will be explained a pedestrian protection apparatus constructed according to a second embodiment. The second embodiment is different from the illustrated first embodiment in structures of the leg sweep member and the movable member. In FIGS. 12 and 13, the same reference numerals as used in FIGS. 1-11 are used to identify the corresponding components and portions, and a detailed explanation of which is dispensed with.

In the second exemplary embodiment, a leg sweep member 88 made of synthetic resin has a base plate 90 having a generally rectangular shape and formed of a thin flat plate without any steps. The base plate 90 has a breadth or width dimension (as measured in a direction perpendicular to the sheet plane of FIG. 12) that is made smaller by a suitable amount than the length of the bumper cover 10 substantially corresponding to the vehicle width and a depth dimension (as measured in a transverse direction in FIG. 12) that is made sufficiently smaller than the breadth dimension thereof. An end surface of the leg sweep member 88 in the depth direction is formed as an end curved surface 92 that is curved along the inner surface of the bumper cover 10. When the leg sweep member 88 is installed on the vehicle, the breadth of the leg sweep member 88 corresponds to the vehicle width or lateral direction and the depth thereof corresponds to the vehicle length or longitudinal direction.

On an upper surface of a substantially half region of the base plate 90 as seen in the depth direction thereof, there are integrally formed, in a lattice, a plurality of long ribs 94 and a plurality of short ribs 96 each of which is a thin flat plate formed of synthetic resin and which extend upright on the upper surface. At one end portion of the leg sweep member 88 that is remote from the end curved surface 92, a plurality of circular openings 98 (here, five circular openings 98) are formed so as to be equally spaced apart from each other in the breadth direction of the leg sweep member 88. In the second exemplary embodiment, the leg sweep member 88 is identical in construction with the leg sweep member 16 in the illustrated first embodiment, except that the base plate 90 has the stepless flat shape.

A movable member 100 is constituted by a single flat plate having a generally rectangular shape. The movable member 100 has a breadth or width dimension (as measured in the direction perpendicular to the sheet plane of FIG. 12 and in a transverse direction in FIG. 13) which is made larger by a suitable amount than the breadth of the base plate 90 of the leg sweep member 88 and which is made smaller by a suitable amount than the length of the bumper cover 10 that substantially corresponds to the vehicle width, and a depth dimension (as measured in a transverse direction in FIG. 12 and in a vertical direction in FIG. 13) which is made smaller by a suitable amount than the depth dimension of the base plate 90 of the leg sweep member 88. One end surface of the movable member 100 in the depth direction is formed as an end curved surface 102 that is curved along the inner surface of the bumper cover 10. When the movable member 100 is installed on the vehicle, the breadth of the movable member 100 corresponds to the vehicle width or lateral direction and the depth thereof corresponds to the vehicle length or longitudinal direction.

At one end portion of the movable ember 100 in the depth direction that is remote from the end curved surface 102, a plurality of circular through-holes 104 are formed through the thickness thereof so as to be equally spaced apart from each other in the breadth direction thereof. Each of the through-holes 104 has a cutout groove 106 formed at a circumferential portion thereof opposite to the end curved surface 102 surface so as to extend, with a suitable length, straightly in the depth direction of the movable member 100. Each cutout groove 106 is open in opposite surfaces (upper and lower surfaces) of the movable member 100.

As in the illustrated first embodiment, the number of the through-holes 104 formed in the movable member 100 is the same as that of the circular openings 98 formed in the leg sweep member 88. Further, the size (diameter) of the through-holes 104 and the circular openings 98 are the same as that of the through-holes 66 formed in the movable member 52 and the circular openings 42 formed in the leg sweep member 16 in the illustrated first embodiment. The intervals at which the through-holes 104 and the circular openings 98 are spaced apart from each other are the same as those at which the through-holes 66 and the circular openings 42 are spaced apart from each other. Further, the length and the opening size of the cutout grooves 106 are the same as those of the cutout grooves 68 in the illustrated first embodiment.

In the second exemplary embodiment, the leg sweep member 88 is superposed on the movable member 100 as shown in FIG. 12 and is disposed in contact with the lower surface of the radiator support 44. Namely, the leg sweep member 88 is disposed inside of the lower protruding portion 22 of the bumper cover 10 so as to be held by and between the movable member 100 and the radiator support 44.

As in the illustrated first embodiment, with the leg sweep member 88 disposed as described above, a distance between the inner surface of the lower protruding portion 22 of the bumper cover 10 and the end curved surface 92 of the leg sweep member 88 is made sufficiently small while a distance between the inner surface of the lower protruding portion 22 and the end curved surface 102 of the movable member 100 is made equal to or larger, by a suitable amount, than the amount of deformation of the lower protruding portion 22 upon contact of the pedestrian therewith. Further, the through-holes 104 of the movable member 100 are offset or deviate from the corresponding circular openings 98 of the leg sweep member 88 in the forward direction, whereby the cutout grooves 106 formed in the respective through-holes 104 are located so as to be in communication with the corresponding circular openings 98. As in the illustrated first embodiment, the installation position of the movable member 100 is determined such that the amount of offset of the through-holes 104 from the corresponding circular openings 98 in the forward direction is made larger than the maximum deformation amount of the lower protruding portion 22 upon the contact of the leg portion 80 of the pedestrian with the bumper cover 10 and smaller than the maximum deformation amount of the lower protruding portion 22 upon the light collision of the obstacle 86 with the bumper cover 10.

As in the illustrated first embodiment, the plurality of fixing bolts 72 in each of which the washer 74 is fitted on the leg portion thereof so as to engage the head portion of the same 72 are screwed at their leg portions into the radiator support 44, such that the fixing bolts 72 are inserted into the corresponding cutout grooves 106 of the movable member 100 and the corresponding circular openings 98 of the leg sweep member 88 that are held in communication with each other, from the underside of the movable member 100, and such that each washer 74 is brought into engagement with the peripheral portion of the corresponding cutout groove 108 at the lower surface of the movable member 100. According to the arrangement, the leg sweep member 88 is fixed to the radiator support 44 by the fixing bolts 72 and the washers 74 via the movable member 100 while the movable member 100 is held by and between the washers 74 fitted on the respective fixing bolts 72 and the radiator support 44.

In the bumper of the second exemplary embodiment, when the deformation amount of the lower protruding portion 22 of the bumper cover 10 reaches maximum due to the contact of the leg portion 80 of the pedestrian with the bumper cover 10, namely, when the amount of advancement of the leg portion 80 with respect to the vehicle reaches the maximum amount that is the prescribed reference amount, the leg sweep member 88 is somewhat deformed but the movable member 100 is not moved in the backward direction, whereby the leg sweep member 88 can be kept fixed to the radiator support 44 with high stability, In consequence, the leg sweep member 88 can effectively exhibit its leg sweeping function upon the contact of the leg portion 80 with the bumper cover 10, so that the leg portion 80 of the pedestrian can be effectively protected.

Upon the light collision of the obstacle 86 with the bumper cover 10, the obstacle 86 is advanced with respect to the vehicle beyond the prescribed reference amount due to large deformation of the lower protruding portion 22 of the bumper cover 10. When the amount of advancement of the obstacle 86 toward the vehicle becomes equal to the amount of offset of the through-holes 104 from the corresponding circular openings 98 in the forward direction, the through-holes 104 and the circular openings 98 are situated coaxially relative to each other, whereby the engagement of the washers 74 fitted on the respective fixing bolts 72 with respect to the movable member 100 is released. As a result, the fixation of the leg sweep member 88 to the radiator support 44 by the bolts 72 and the washers 74 is released while, at the same time, the holding of the movable member 100 between the washers 74 and the radiator support 44 is released. Therefore, upon the light collision of the obstacle 86 with the bumper cover 10, the movable member 100 and the leg sweep member 88 drop before the amount of advancement of the obstacle 86 toward the vehicle reaches maximum, thereby advantageously preventing the equipment and the components disposed at the front of the vehicle such as the radiator 50 from being damaged due to contact with the movable member 100 and the leg sweep member 88.

In the bumper of the second exemplary embodiment, the leg portion 80 of the pedestrian collided with the bumper cover 10 can be advantageously protected. In addition, the equipment and the components disposed at the front of the vehicle can be prevented from being seriously damaged due to the light collision of the obstacle 86 with the bumper cover 10.

While the preferred embodiments of the present invention have been described in detail by reference to the drawings, it is to be understood that the present invention may be otherwise embodied.

For instance, the structures of the leg sweep members 16, 88 are not limited to those in the illustrated first and second embodiments, but any other known structure may be employed.

In the illustrated first and second embodiments, the leg sweep members 16, 88 are fixed to the radiator support 44. The leg sweep members 16, 88 may be fixed to any other structural member of the vehicle such as a cross member or a side member disposed at the lower portion of the front of the vehicle.

The fixing mechanism in the illustrated first and second embodiments may be otherwise constructed, provided that the fixing mechanism is arranged to fix the leg sweep member to the vehicle structural member and release the leg sweep member from the vehicle structural member when, in the event of a collision of an object with the front end of the vehicle, the object advances, by an amount that exceeds the prescribed reference amount, with respect to the vehicle in its backward direction from a position of the front end of the vehicle against which the object has hit upon the collision.

Accordingly, the fixing mechanism may be constituted by including: a fixing device which fixes the leg sweep member to the radiator support or the like; a detecting device which successively detects, upon the contact or collision of the object such as the leg portion of the pedestrian or the obstacle with the front end of the vehicle, an amount of advancement of the object with respect to the vehicle in the backward direction from the position of the front end of the vehicle against which the object has hit; and a releasing device which releases the fixation of the leg sweep member to the radiator support or the like when the amount detected by the detecting device exceeds the prescribed reference amount.

Figure 14:
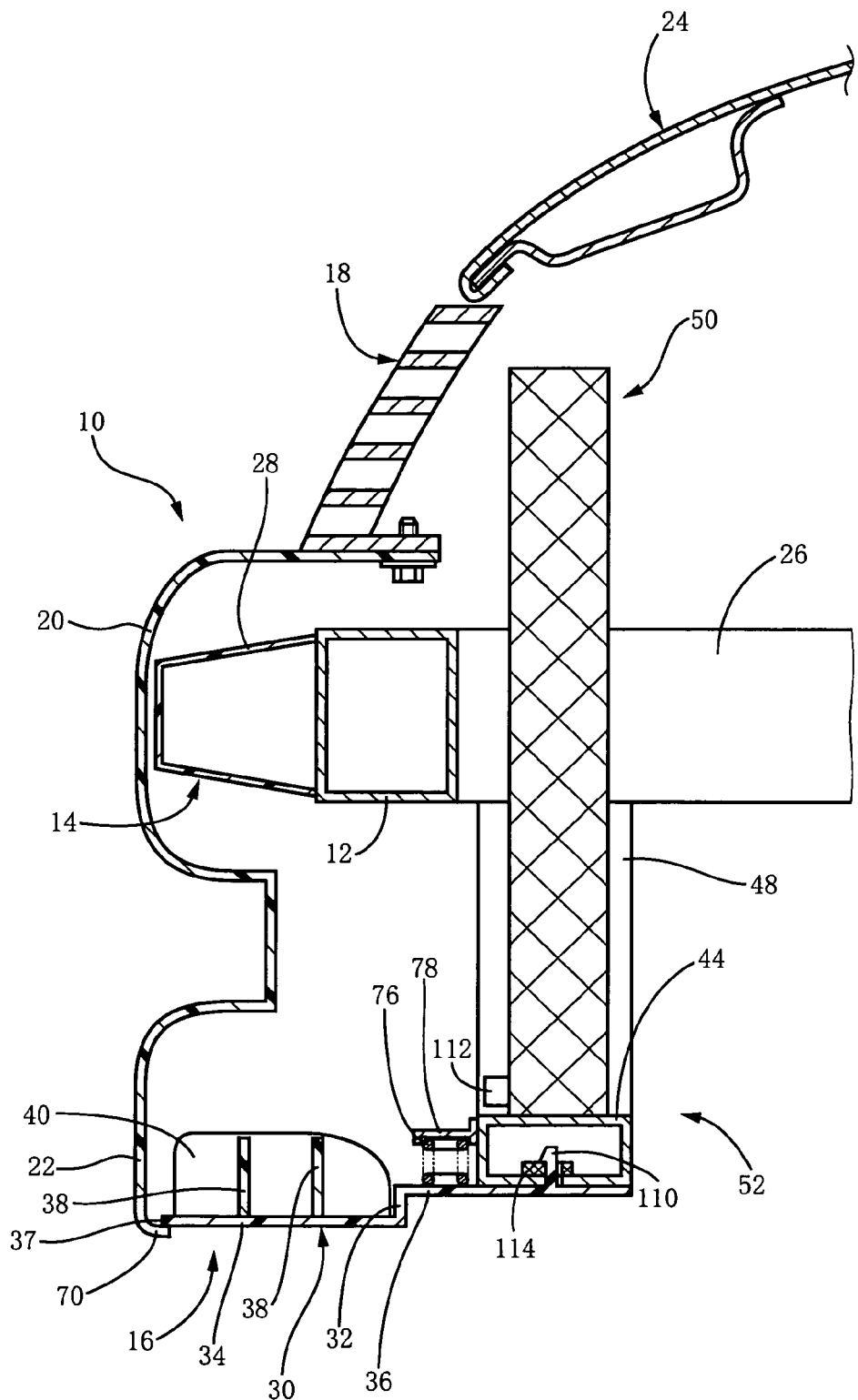
FIG. 14 is a view showing still another example of the bumper according to the present invention, the view corresponding to FIG. 1.
Figure 15:
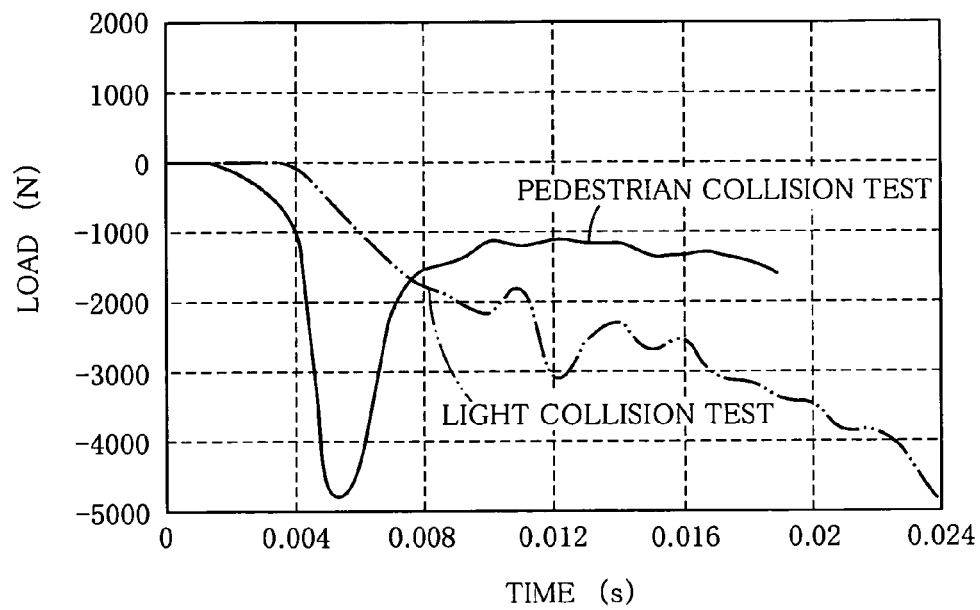
FIG. 15 is a graph showing changes with the elapse of time in the load at a fixing portion of the leg sweep member at which the leg sweep member is fixed to the vehicle, the changes being respectively obtained in a pedestrian collision test on the supposition of a collision of a pedestrian with a forward end of a front bumper in which is disposed the leg sweep member and in a light collision test on the supposition of a light collision of an obstacle with the forward end of the front bumper.
Figure 16:
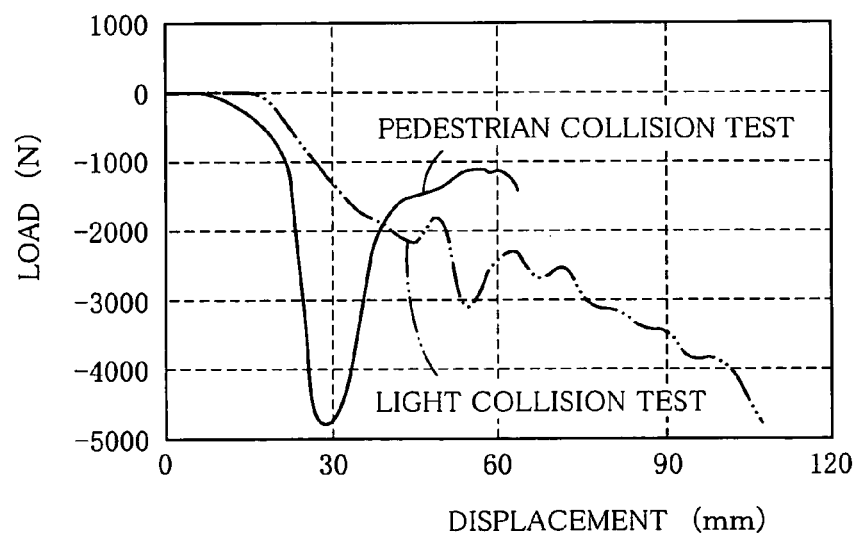
FIG. 16 is a graph showing relationships between displacement amount of the bumper cover of the front bumper and load, the relationships being respectively obtained in a pedestrian collision test on the supposition of a collision of a pedestrian with a forward end of a front bumper in which is disposed the leg sweep member and in a light collision test on the supposition of a light collision of an obstacle with the forward end of the front bumper.

Described more specifically referring to FIG. 14, the leg sweep member 16 is fixed, by resin clips 110 or the like, to the radiator support 44 or the like so as to be inhibited from moving. Further, there is provided, at the front of the vehicle (here, on the radiator 50), a sensor 112 such as a proximity sensor which is arranged to mechanically or electrically detect an amount of displacement of the bumper cover 10 of the front bumper in the backward direction upon the contact or collision of the object with the front bumper while the sensor 112 is in contact or out of contact with the bumper cover 10. When the amount of displacement of the bumper cover 10 detected by the sensor 112 exceeds the prescribed reference value, the resin clips 110 which fix the leg sweep member 16 to the radiator support 44 are broken by explosion using an explosive device 114 which is filled with a suitable explosive compound, whereby the leg sweep member 16 is released from the radiator support 44. In this instance, the prescribed reference amount is set to be larger than the maximum deformation amount of the bumper cover 10 upon the contact of the leg portion of the pedestrian with the front bumper and smaller than the maximum deformation amount of the bumper cover 10 upon the light collision of the obstacle with the front bumper.

In the illustrated first and second embodiments, the pedestrian protection apparatus is incorporated in the bumper, but the apparatus may be arranged to be provided independently of the bumper.

"The prescribed reference amount" may be suitably determined within a range from not smaller than the maximum amount of advancement of the pedestrian toward the vehicle upon the contact of the pedestrian with the front end of the vehicle to less than the maximum amount of advancement of the obstacle toward the vehicle upon the light collision at the vehicle front end.

As the biasing device disposed between the leg sweep member and the vehicle structural member, any structure that biases the leg sweep member downward may be suitably employed, other than the illustrated compression coil springs 76.

The principle of the present invention is advantageously applicable to any pedestrian protection apparatus and bumper which are disposed at a front end of vehicles other than automotive vehicles.

It is to be understood that the present invention may be embodied with various other changes and modifications which may occur to those skilled in the art, without departing from the spirit and scope of the invention defined in the following claims.

What is claimed is:

1. A pedestrian protection apparatus disposed at a front of a vehicle for protecting a pedestrian in the event of a collision between the pedestrian and a front end of the vehicle, the apparatus comprising:
   a leg sweep member, which is disposed at a lower part of the front end of the vehicle so as to protrude frontward, from the front of the vehicle for sweeping a leg portion of the pedestrian colliding with the front end of the vehicle; and
   a fixing mechanism which fixes the leg sweep member to a structural member of the vehicle and which releases the fixation of the leg sweep member to the structural member when an object, including the pedestrian, which has collided with the front end of the vehicle, advances the leg sweep member in a backward direction with respect to the front of the vehicle by an amount that exceeds a predetermined amount.

2. The apparatus according to claim 1,
   the fixing mechanisms further comprising: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface thereof which is one of opposite surfaces on an opposing surface of the holding portion remote from the leg sweep member, the movable member being arranged to be moved, when being pushed by the advancing movement of the object in a backward direction with respect to the front end of the vehicle from an engaging position, where the engaging surface of the holding portion and the engaging portion of the engaging protrusion engage each other, to a non-engaging position, where the engagement of the engaging surface of the holding portion and the engaging portion of the engaging protrusion is released, when the advancing movement of the object advances the leg sweep member in a backward direction with respect to the front of the vehicle by an amount that exceeds the predetermined amount,
   wherein, when the movable member is located at the engaging position, the leg sweep member is held by and between the engaging protrusion and the structural member via the holding portion of the movable member so as to be fixed to the structural member, and
   wherein, when the movable member is moved to the non-engaging position, the holding of the leg sweep member between the engaging protrusion and the structural member is released, thereby releasing the leg sweep member from the structural member.

3. The apparatus according to claim 2,
the holding portion of the movable member of the fixing mechanism further comprising: a through-hole formed through a thickness of the holding portion in a vertical direction of the vehicle; and a cutout groove, which is formed at a circumferential portion of the through-hole so as to extend in the backward direction with respect to the front of the vehicle, having a length equal to the predetermined amount of movement necessary to release the moveable member and a lower surface of the holding portion surrounding the cutout groove constitutes the engaging surface, wherein the engaging protrusion of the fixing mechanism is constituted by a bolt member which is fastened to the structural member of the vehicle and which includes a leg portion that can be inserted through the cutout groove and a head portion that can be inserted through the through-hole and cannot be inserted through the cutout groove, the head portion constituting the engaging portion, wherein the leg sweep member further comprises an opening through which the head portion of the bolt member can be inserted, wherein, when the movable member is located at the engaging position, the leg portion of the bolt member extends through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and wherein when the moveable member is moved from the engaging position to the non-engaging position by the advancing movement of the object, the head portion of the bolt member is located in the through-hole of the holding portion and the holding of the leg sweep member between the head portion of the bolt member and the structural member of the vehicle is released, thereby causing the movable member and the leg sweep member drop downward, from the front end of the vehicle.

4. The apparatus according to claim 1, the fixing mechanism further comprising: a fixing device which fixes the leg sweep member to the structural member of the vehicle; a detecting device which successively detects an amount of advancing movement of the object with respect to the front end of the vehicle against which the object has collided; and a releasing device which releases the fixation of the leg sweep member to the structural member of the vehicle when the amount of advancing movement of the object with respect to the front of the vehicle detected by the detecting device exceeds the predetermined amount.

5. The apparatus according to claim 1, further comprising a biasing device which is disposed between the leg sweep member and the structural member of the vehicle for biasing the leg sweep member to release in a downward direction from the front end of the vehicle.

6. The apparatus according to claim 1, wherein the structural member of the vehicle is one of a radiator support, a cross member, and a side member.

7. An installation structure for installing a leg sweep member at a lower part of a front end of the vehicle to protrude frontward for sweeping a leg portion of a pedestrian in the event of a collision between the pedestrian and the front end of the vehicle,
wherein the leg sweep member is fixed to a structural member of the vehicle that is disposed at the front of the vehicle by a fixing mechanism, wherein the fixing mechanism releases the fixation of the leg sweep member to the structural member when an object, including the pedestrian, which has collided with the front end of the vehicle, advances the leg sweep member in a backward direction with respect to the front of the vehicle by an amount that exceeds a predetermined amount.

8. The installation structure according to claim 7,
the fixing mechanism further comprising: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface on an opposing surface of the holding portion remote from the leg sweep member, the movable member being arranged to be moved, when being pushed by with the advancing movement of the object in a backward direction with respect to the front end of the vehicle from an engaging position, where the engaging surface of the holding portion and the engaging portion of the engaging protrusion engage each other, to a non-engaging position, where the engagement of the engaging surface of the holding portion and the engaging portion of the engaging protrusion is released, when the advancing movement of the object advances the leg sweep member in a backward direction with respect to the front of the vehicle by an amount that exceeds the predetermined amount, wherein, when the movable member is located at the engaging position, the leg sweep member is held by and between the engaging protrusion and the structural member via the holding portion of the movable member so as to be fixed to the structural member, and wherein, when the movable member is moved to the non-engaging position, the holding of the leg sweep member between the engaging protrusion and the structural member is released, thereby releasing the leg sweep member from the structural member.

9. The installation structure according to claim 8,
the holding portion of the movable member further comprising a through-hole formed through a thickness of the holding portion in a vertical direction of the vehicle; and a cutout groove which is formed at a circumferential portion of the through-hole so as to extend in the backward direction with respect to the front of the vehicle having a length equal to the predetermined amount of movement necessary to release the moveable member, and a lower surface of the holding portion surrounding the cutout groove constitutes the engaging surface, wherein the engaging protrusion of the fixing mechanism is constituted by a bolt member which is fastened to the structural member of the vehicle and which includes a leg portion that can be inserted through the cutout groove and a head portion that can be inserted through the through-hole and cannot be inserted through the cutout groove, and the head portion constituting the engaging portion, wherein the leg sweep member further comprises an opening through which the head portion of the bolt member can be inserted, wherein, when the movable member is located at the engaging position, the leg portion of the bolt member is inserted through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and wherein when the moveable member is moved from the engaging position to the non-engaging position by the advancing movement of the object, the head portion of the bolt member is located in the through-hole of the holding portion and the holding of the leg sweep member between the head portion of the bolt member and the structural member of the vehicle is released, thereby causing the movable member and the leg sweep member drop downward, from the front end of the vehicle.

10. The installation structure according to claim 7, the fixing mechanism further comprising: a fixing device which fixes the leg sweep member to the structural member of the vehicle; a detecting device which successively detects an amount of advancing movement of the object with respect to the front end of the vehicle against which the object collided, and a releasing device which releases the fixation of the leg sweep member to the structural member of the vehicle when the amount of advancing movement of the object with respect to the front of the vehicle detected by the detecting device exceeds the predetermined amount.

11. The installation structure according to claim 7, further comprising a biasing device which is disposed between the leg sweep member and the structural member of the vehicle for biasing the leg sweep member to release in a downward direction from the front of the vehicle.

12. The installation structure according to claim 7, wherein the structural member of the vehicle is one of a radiator support, a cross member, and a side member.

13. A front structure of a vehicle comprising: sweep member for sweeping a leg portion of a pedestrian colliding with a front end of the vehicle, wherein the leg sweep member is fixed to a structural member of the vehicle such that the leg sweep member is disposed at the lower part of the front end of the vehicle so as to protrude frontward from the front end of the vehicle, and wherein a fixing mechanism is provided which releases the fixation of the leg sweep member to the structural member of the vehicle when an object, including the pedestrian, which has collided with the front end of the vehicle, advances the leg sweep member in a backward direction with respect to the front of the vehicle by an amount that exceeds a predetermined amount.

14. The front structure of a vehicle according to claim 13, the fixing mechanism further comprises: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface on an opposing surface of the holding portion remote from the leg sweep member, the movable member being arranged to be moved, when being pushed by the advancing movement of the object in a backward direction with respect to the front end of the vehicle from an engaging position, where the engaging surface of the holding portion and the engaging portion of the engaging protrusion engage each other, to a non-engaging position, where the engagement of the engaging surface of the holding portion and the engaging portion of the engaging protrusion is released, when the advancing movement of the object advances the leg sweep member in a backward direction with respect to the front end of the vehicle by an amount that exceeds the predetermined amount, wherein, when the movable member is located at the engaging position, the leg sweep member is held by and between the engaging protrusion and the structural member via the holding portion of the movable member so as to be fixed to the structural member, and wherein, when the movable member is moved to the non-engaging position, the holding of the leg sweep member between the engaging protrusion and the structural member is released, thereby releasing the leg sweep member from the structural member.

15. The front structure of a vehicle according to claim 14, the holding portion of the movable member of the fixing mechanism further comprising: a through-hole formed through a thickness of the holding portion in a vertical direction of the vehicle; and a cutout groove, which is formed at a circumferential portion of the through-hole so as to extend in the backward direction with respect to the front of the vehicle having a length equal to the predetermined amount of movement necessary to release the moveable member, and a lower surface of the holding portion surrounding the cutout groove constitutes the engaging surface, wherein the engaging protrusion of the fixing mechanism is constituted by a bolt member which is fastened to the structural member of the vehicle and which includes a leg portion that can be inserted through the cutout groove and a head portion that can be inserted through the through-hole and cannot be inserted through the cutout groove, the head portion constituting the engaging portion, wherein the leg sweep member further comprises an opening through which the head portion of the bolt member can be inserted, wherein, when the movable member is located at the engaging position, the leg portion of the bolt member extends through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and wherein when the moveable member is moved from the engaging position to the non-engaging position by the advancing movement of the object, the head portion of the bolt member is located in the through-hole of the holding portion and the holding of the leg sweep member between the head portion of the bolt member and the structural member of the vehicle is released, thereby causing the movable member and the leg sweep member drop downward, from the front end of the vehicle.

16. The front structure of a vehicle according to claim 13, the fixing mechanism further comprising: a fixing device which fixes the leg sweep member to the structural member of the vehicle; a detecting device which successively detects an amount of advancing movement of the object with respect to the front end of the vehicle against which the object has collided, and a releasing device which releases the fixation of the leg sweep member to the structural member of the vehicle when the amount of advancing movement of the object with respect to the front end of the vehicle detected by the detecting device exceeds the predetermined amount.

17. The front structure of a vehicle according to claim 13, further comprising a biasing device which is disposed between the leg sweep member and the structural member of the vehicle for biasing the leg sweep member to release in a downward direction from the front end of the vehicle.

18. The front structure of a vehicle according to claim 13, wherein the structural member of the vehicle is one of a radiator support, a cross member, and a side member.

19. A vehicle bumper attached to a front of a vehicle and including a bumper cover that is disposed at a front end of the vehicle so as to protrude frontward from the front of the vehicle, comprising:
- a leg sweep member which is disposed inside of a lower part of the bumper cover and protrudes frontward for sweeping a leg portion of a pedestrian colliding with the front end of the vehicle; and
- a fixing mechanism which fixes the leg sweep member to a structural member of the vehicle and which releases the fixation of the leg sweep member to the structural member when an object including the pedestrian which has collided with the front end of the vehicle advances the leg sweep member in a backward direction with respect to the front of the vehicle by an amount that exceeds a predetermined amount.

20. The vehicle bumper according to claim 19,
the fixing mechanism further comprising: (a) an engaging protrusion which is fixedly disposed with respect to the structural member so as to protrude therefrom and which has, at a leading end thereof, an engaging portion; and (b) a movable member which is disposed such that the leg sweep member is sandwiched between the movable member and the structural member and which has a holding portion that engages the engaging portion of the engaging protrusion at an engaging surface thereof on an opposing surface of the holding portion remote from the leg sweep member, the movable member being arranged to be moved, when being pushed by the advancing movement of the object in a backward direction with respect to the front end of the vehicle from an engaging position, where the engaging surface of the holding portion and the engaging portion of the engaging protrusion engage each other, to a non-engaging position, where the engagement of the engaging surface of the holding portion and the engaging portion of the engaging protrusion is released, when the advancing movement of the object advances the leg sweep member in a backward direction with respect to the front end of the vehicle by an amount that exceeds the predetermined amount,
wherein, when the movable member is located at the engaging position, the leg sweep member is held by and between the engaging protrusion and the structural member via the holding portion of the movable member so as to be fixed to the structural member, and
wherein, when the movable member is moved to the non-engaging position, the holding of the leg sweep member between the engaging protrusion and the structural member is released, releasing the leg sweep member from the structural member.

21. The vehicle bumper according to claim 20,
the holding portion of the movable member of the fixing mechanism further comprising: a through-hole formed through a thickness of the holding portion in a vertical direction; and a cutout groove, which is formed at a circumferential portion of the through-hole so as to extend in the backward direction of the vehicle having a length equal to the predetermined amount of movement necessary to release the moveable member, and a lower surface of the holding portion surrounding the cutout groove constitutes the engaging surface,
wherein the engaging protrusion of the fixing mechanism is constituted by a bolt member which is fastened to the structural member of the vehicle and which includes a leg portion that can be inserted through the cutout groove and a head portion that can be inserted through the through-hole and cannot be inserted through the cutout groove, the head portion constituting the engaging portion,
wherein the leg sweep member further includes an opening through which the head portion of the bolt member can be inserted,
wherein, when the movable member is located at the engaging position, the leg portion of the bolt member extends through the cutout groove of the holding portion and the opening of the leg sweep member and the head portion of the bolt member engages the lower surface of the holding portion, so that the leg sweep member is held by and between the head portion of the bolt member and the structural member of the vehicle via the movable member, and
wherein when the moveable member is moved from the engaging position to the non-engaging position by the advancing movement of the object, the head portion of the bolt member is located in the through-hole of the holding portion and the holding of the leg sweep member between the head portion of the bolt member and the structural member of the vehicle is released, thereby causing the movable member and the leg sweep member drop downward, from the front end of the vehicle.

22. The vehicle bumper according to claim 19, the fixing mechanisms further comprising:
- a fixing device which fixes the leg sweep member to the structural member of the vehicle;
- a detecting device which successively detects an amount of advancing movement of the object with respect to the front end of the vehicle against which the object has collided; and
- a releasing device which releases the fixation of the leg sweep member to the structural member of the vehicle when the amount of advancing movement of the object detected by the detecting device exceeds the predetermined amount.

23. The vehicle bumper according to claim 19, further comprising a biasing device which is disposed between the leg sweep member and the structural member of the vehicle for biasing the leg sweep member to release in a downward direction from the front end of the vehicle.

24. The vehicle bumper according to claim 19, wherein the structural member of the vehicle is one of a radiator support, a cross member, and a side member.

* * * * *